United States Patent
Lee

(10) Patent No.: US 11,166,478 B2
(45) Date of Patent: Nov. 9, 2021

(54) METHOD OF MAKING ANIMAL FEEDS FROM WHOLE STILLAGE

(71) Applicant: Lee Tech LLC, Los Gatos, CA (US)

(72) Inventor: Chie Ying Lee, Los Gatos, CA (US)

(73) Assignee: Lee Tech LLC, Fremont, CA (US)

( * ) Notice: Subject to any disclaimer, the term of this patent is extended or adjusted under 35 U.S.C. 154(b) by 0 days.

(21) Appl. No.: 17/081,856

(22) Filed: Oct. 27, 2020

(65) Prior Publication Data

US 2021/0059277 A1 Mar. 4, 2021

Related U.S. Application Data

(63) Continuation-in-part of application No. 15/187,702, filed on Jun. 20, 2016, now abandoned.
(Continued)

(51) Int. Cl.
| | |
|---|---|
| A23K 10/38 | (2016.01) |
| A23K 50/75 | (2016.01) |
| A23K 50/30 | (2016.01) |
| A23K 50/80 | (2016.01) |
| A23K 50/10 | (2016.01) |

(Continued)

(52) U.S. Cl.
CPC ............ *A23K 10/38* (2016.05); *A23K 10/12* (2016.05); *A23K 40/00* (2016.05); *A23K 50/10* (2016.05); *A23K 50/30* (2016.05); *A23K 50/40* (2016.05); *A23K 50/75* (2016.05); *A23K 50/80* (2016.05);
(Continued)

(58) Field of Classification Search
CPC .......... A23K 10/12; A23K 10/38; B01D 3/10; B01D 29/03; B01D 29/50
See application file for complete search history.

(56) References Cited

U.S. PATENT DOCUMENTS

| | | | |
|---|---|---|---|
| 1,942,943 | A | 1/1934 | Schnabel |
| 2,190,176 | A | 2/1940 | Smith |

(Continued)

FOREIGN PATENT DOCUMENTS

| | | |
|---|---|---|
| AU | 2013200519 B2 | 2/2013 |
| CN | 1883299 A | 12/2006 |

(Continued)

OTHER PUBLICATIONS

The Office Action from the Canadian Patent Application No. 2,951,715 dated Aug. 28, 2020.
(Continued)

*Primary Examiner* — Walter A Moore
(74) *Attorney, Agent, or Firm* — Haverstock & Owens LLP

(57) ABSTRACT

A method of and system for making at least four types of animal feed products for various types of animals to maximize and use all of the components found in the whole stillage in an alcohol producing plant. The method includes liquefying, fermenting, distilling, performing a selective particle size separating into three streams, wherein the three streams contain a first stream of a large particle stream that is used to form a first animal feed suitable for ruminant animals, a second stream of a coarse protein stream that is used to form a second animal feed suitable for chicken and pigs, and a third stream of a fine particle stream that is used to form a third animal feed suitable for fish and pet. The third stream is further concentrated and enriched to have a syrup with 35%-80% of dry solid.

22 Claims, 15 Drawing Sheets

Related U.S. Application Data

(60) Provisional application No. 62/927,606, filed on Oct. 29, 2019.

(51) Int. Cl.
*A23K 40/00* (2016.01)
*B01D 29/03* (2006.01)
*B01D 29/50* (2006.01)
*A23K 10/12* (2016.01)
*A23K 50/40* (2016.01)
*B01D 3/10* (2006.01)

(52) U.S. Cl.
CPC ............... *B01D 3/10* (2013.01); *B01D 29/03* (2013.01); *B01D 29/50* (2013.01)

(56) References Cited

U.S. PATENT DOCUMENTS

| | | | |
|---|---|---|---|
| 2,313,275 | A * | 3/1943 | Schopmeyer .......... A23K 10/16 426/656 |
| 2,600,903 | A | 6/1952 | Miller |
| 2,967,107 | A | 1/1961 | Geiger et al. |
| 3,054,676 | A | 9/1962 | Lauhoff et al. |
| 3,058,887 | A | 10/1962 | Platt et al. |
| 3,753,723 | A | 8/1973 | Henderson |
| 3,786,078 | A | 1/1974 | Smith et al. |
| 3,827,423 | A | 8/1974 | Bolitho |
| 3,973,043 | A | 8/1976 | Lynn |
| 3,975,546 | A | 8/1976 | Stahmann |
| 4,042,172 | A | 8/1977 | Norzdrovsky |
| 4,130,553 | A | 12/1978 | Batley, Jr. |
| 4,171,383 | A | 10/1979 | Chwalek et al. |
| 4,255,518 | A | 3/1981 | Muller et al. |
| 4,313,061 | A | 1/1982 | Thomas |
| 4,333,871 | A | 6/1982 | De Jong |
| 4,341,713 | A | 7/1982 | Stolp et al. |
| 4,361,651 | A | 11/1982 | Keim |
| 4,396,161 | A | 8/1983 | Roukolainen et al. |
| 4,517,022 | A | 5/1985 | Harvey |
| 4,635,864 | A | 1/1987 | Peterson et al. |
| 4,772,481 | A | 9/1988 | Rohwer |
| 4,835,100 | A | 5/1989 | Dixon |
| 4,857,325 | A | 8/1989 | Albeck |
| 4,978,618 | A | 12/1990 | Kalina |
| 5,177,008 | A | 1/1993 | Kampen |
| 5,244,159 | A | 9/1993 | Newman |
| 5,248,099 | A | 9/1993 | Lahner et al. |
| 5,294,434 | A | 3/1994 | King |
| 5,364,335 | A | 9/1994 | Franzen et al. |
| 5,475,099 | A | 12/1995 | Knauf |
| 5,516,974 | A | 5/1996 | Sasae |
| 5,994,113 | A | 11/1999 | Kauppinen et al. |
| 6,080,401 | A | 6/2000 | Reddy |
| 6,190,462 | B1 | 2/2001 | Markland et al. |
| 6,254,914 | B1 | 7/2001 | Singh et al. |
| 6,274,358 | B1 | 8/2001 | Holtz et al. |
| 6,899,910 | B2 | 5/2005 | Johnston et al. |
| 7,297,236 | B1 | 11/2007 | Vander Griend |
| 7,563,469 | B1 | 7/2009 | Navarro et al. |
| 7,700,094 | B1 | 4/2010 | Nsereko |
| 7,858,140 | B2 | 12/2010 | Paustian et al. |
| 9,012,191 | B2 | 4/2015 | Lee |
| 9,388,475 | B2 | 7/2016 | Lee |
| 9,777,303 | B2 | 10/2017 | Jakel et al. |
| 10,190,086 | B2 | 1/2019 | Narendranath et al. |
| 2001/0014360 | A1 | 8/2001 | Paluch |
| 2002/0122944 | A1 | 9/2002 | Ogle et al. |
| 2004/0009160 | A1 | 1/2004 | Villamar |
| 2004/0071757 | A1 | 4/2004 | Rolf |
| 2004/0087808 | A1 | 5/2004 | Prevost et al. |
| 2004/0187863 | A1 | 9/2004 | Langhauser |
| 2004/0258782 | A1 | 12/2004 | Hoffman et al. |
| 2005/0009133 | A1 | 1/2005 | Johnston et al. |
| 2005/0028810 | A1 | 2/2005 | Lee |
| 2005/0100996 | A1 | 5/2005 | Lantero, Jr. et al. |
| 2005/0170067 | A1 | 8/2005 | Shao et al. |
| 2005/0249837 | A1 | 11/2005 | Massimio et al. |
| 2005/0281792 | A1 | 12/2005 | Short |
| 2006/0127453 | A1 | 6/2006 | Harel |
| 2006/0154353 | A1 | 7/2006 | Duan |
| 2006/0292677 | A1 | 12/2006 | Ostrander |
| 2007/0066476 | A1 | 3/2007 | Ullmann |
| 2007/0184159 | A1 | 8/2007 | Shima et al. |
| 2007/0184541 | A1 | 8/2007 | Karl et al. |
| 2007/0210007 | A1 | 9/2007 | Scheimann et al. |
| 2007/0231311 | A1 | 10/2007 | Kroening |
| 2008/0095881 | A1 | 4/2008 | Ber |
| 2008/0210541 | A1 | 9/2008 | Wenger et al. |
| 2009/0029432 | A1 | 1/2009 | Abbas et al. |
| 2009/0093027 | A1 | 4/2009 | Balan et al. |
| 2009/0061490 | A1 | 5/2009 | Edwards et al. |
| 2009/0181153 | A1 | 7/2009 | Bendorf et al. |
| 2009/0227004 | A1 | 9/2009 | Dale |
| 2010/0028484 | A1 | 2/2010 | Kriesler et al. |
| 2010/0082312 | A1 | 4/2010 | Macharia |
| 2010/0093860 | A1 | 4/2010 | Boon et al. |
| 2010/0120128 | A1 | 5/2010 | Liang |
| 2010/0159547 | A1 | 6/2010 | Falcounbridge |
| 2010/0159552 | A1 | 6/2010 | Benson et al. |
| 2010/0196994 | A1 | 8/2010 | Van Leeuwen et al. |
| 2010/0260918 | A1 | 10/2010 | Wang |
| 2010/0324274 | A1 | 12/2010 | DeFrees |
| 2011/0086149 | A1 | 4/2011 | Bootsma |
| 2011/0100359 | A1 | 5/2011 | North |
| 2011/0106277 | A1 | 5/2011 | Sayyar-Rodsari |
| 2011/0123657 | A1 | 5/2011 | Vandenbroucke et al. |
| 2011/0150853 | A1 | 6/2011 | Mann et al. |
| 2011/0177560 | A1 | 7/2011 | Galvez, III et al. |
| 2011/0223307 | A1 | 9/2011 | Bertoldo de Barros et al. |
| 2011/0250310 | A1 | 10/2011 | Mateus |
| 2011/0250312 | A1 | 10/2011 | Lewis |
| 2011/0269185 | A1 | 11/2011 | David |
| 2011/0283602 | A1 | 11/2011 | Gallop et al. |
| 2011/0315541 | A1 | 12/2011 | Xu |
| 2012/0048716 | A1 | 3/2012 | Sonnek |
| 2012/0077232 | A1 | 3/2012 | Budaraju et al. |
| 2012/0077244 | A1 | 3/2012 | Budaraju et al. |
| 2012/0107454 | A1 | 5/2012 | Hoffman et al. |
| 2012/0125859 | A1 | 5/2012 | Collins |
| 2012/0168387 | A1 | 7/2012 | Tran et al. |
| 2012/0183643 | A1 | 7/2012 | Dale |
| 2012/0199531 | A1 | 8/2012 | Winsness |
| 2012/0244590 | A1 * | 9/2012 | Lee ..................... C12M 45/02 435/161 |
| 2012/0245123 | A1 | 9/2012 | Lopez Pedrosa et al. |
| 2012/0252065 | A1 | 10/2012 | Rozenszain et al. |
| 2012/0270275 | A1 | 10/2012 | Fenton et al. |
| 2013/0121891 | A1 | 5/2013 | Dieker |
| 2013/0130343 | A1 | 5/2013 | Purtle et al. |
| 2013/0224333 | A1 | 8/2013 | Nanjundaswamy et al. |
| 2013/0236936 | A1 | 9/2013 | Lee |
| 2013/0288376 | A1 | 10/2013 | Lee |
| 2013/0206342 | A1 | 11/2013 | Dahmes |
| 2013/0316041 | A1 | 11/2013 | Maranz |
| 2013/0337517 | A1 | 12/2013 | Razavi-Shirazi |
| 2013/0344045 | A1 | 12/2013 | Faure |
| 2014/0004571 | A1 | 1/2014 | Garrett |
| 2014/0053829 | A1 * | 2/2014 | Lee ..................... C13K 13/007 127/42 |
| 2014/0102950 | A1 | 4/2014 | Bethke |
| 2014/0186868 | A1 | 7/2014 | Siegert |
| 2014/0206055 | A1 | 7/2014 | Ramos |
| 2014/0242251 | A1 | 8/2014 | Bootsma |
| 2014/0273140 | A1 | 9/2014 | Langhouser |
| 2014/0319066 | A1 | 10/2014 | LoCascio |
| 2014/0343254 | A1 | 11/2014 | Gerardi |
| 2015/0152372 | A1 | 6/2015 | Kohl |
| 2015/0176034 | A1 | 6/2015 | Ramos |
| 2015/0223493 | A1 | 8/2015 | Lee |
| 2015/0231535 | A1 * | 8/2015 | Lee ..................... B07B 1/20 210/767 |
| 2015/0240266 | A1 | 8/2015 | Lee |
| 2015/0307822 | A1 | 10/2015 | Rossell et al. |

(56) References Cited

U.S. PATENT DOCUMENTS

| | | | |
|---|---|---|---|
| 2016/0060658 A1 | 3/2016 | Lee | |
| 2016/0374364 A1* | 12/2016 | Lee | A23K 10/18 426/53 |
| 2017/0058300 A1 | 3/2017 | Aurandt | |
| 2018/0225669 A1 | 8/2018 | Brotherson | |
| 2019/0017080 A1 | 1/2019 | Bootsma | |
| 2019/0241834 A1 | 8/2019 | Lee | |

FOREIGN PATENT DOCUMENTS

| | | |
|---|---|---|
| CN | 1966706 A | 5/2007 |
| CN | 101080483 A | 11/2007 |
| CN | 101453884 A | 8/2009 |
| CN | 101621935 A | 1/2010 |
| CN | 101795578 A | 8/2010 |
| CN | 104703957 A | 6/2015 |
| DE | 4239342 A1 | 5/1994 |
| EP | 0772978 B1 | 11/1991 |
| GB | 511525 A | 8/1939 |
| GB | 852995 A | 11/1960 |
| WO | 01/14595 A2 | 3/2001 |
| WO | 2012075481 A1 | 6/2012 |
| WO | 2012145230 A1 | 10/2012 |
| WO | 2012160191 A2 | 11/2012 |
| WO | 2012166290 A1 | 12/2012 |
| WO | 2013034747 A1 | 3/2013 |
| WO | 2014031700 A2 | 2/2014 |
| WO | 20140127852 A2 | 8/2014 |
| WO | 2016033548 A1 | 3/2016 |

OTHER PUBLICATIONS

The Office Action from the Argentinian Patent Application No. 20160101901 dated Aug. 19, 2020.
The International Search Report and Written Opinion for the International Application No. PCT/US2020/057558 dated Jan. 27, 2021.
The Office Action dated Dec. 4, 2020, for Chinese Patent Application No. 201680003607.2.
Best way to keep dog food and treats fresh—Vacuum seal!,vacmasterfresh.com, Aug. 26, 2015 [online], [retrieved Feb. 11, 2021]. Retrieved from the Internet<https://www.vacmasterfresh.com/fresh-bites-blog/ best-way-to-keep-dog-food-and -treats-fresh-vacuum-seal/>(Year:2015).
The Pelleting Process, California Pellet Mill Co., May 17, 2017[online], [retrieved Feb. 11, 2021]. Retrieved from the Internet<https://www.cpm.net/downloads/Animal%20Feed%20Pelleting.pdf>(Year:2017).
Vibrating Fluid Bed Dryers, Carrier Vibrating, May 12, 2017[online], [retrieved Feb. 17, 2021].Retrieved from the Internet<https://www.carriervibrating.com/equipment/dryers/vibrating/>(2017).
Imran M. et al., Role of Enzymes in Animal Nutrition: A Review, PSM Vet. Res., 01(2)(2016): 38-45. (Year: 2016).
How many different chemical reactions ca a single enzyme catalyze?,Truong-Son N, Jan. 3, 2016 [online], [retrieved Mar. 4, 2021]. Retrieved from the Internet<https://socratic.org/questions/jo-many-different-chemical-reactions-can-a single-enzyme-catalyze>(Year:2016).
The International Search Report and Written Opinion for the Application No. PCT/US20/55174 dated Mar. 18, 2021.
Xu et al., Continuous ethanol production using self-flocculating yeast in a cascade of fermentors Enzyme and Microbial Technology 37 (2005) 634-640, entire document esp p. 635-636.
https://en.wikipedia.org/windex.php?title=Clean-in-place&oldid=889731953'Clean-inplace'27 Mar. 2019, entire document esp p. 2.
International Search Report and Written Opinion from PCT Application No. PCT/US15/47577, dated Apr. 30, 2020.
"Organic" organic.org; published Dec. 25, 2012, accessed on Mar. 3, 2017, available at htt://web.archive.org/web/20121225201858/http://www.organic.org/home /faq.
Alfagreen supreme: available at:https://web.archive.org/web/20121207050 40902/thttp://www.alfagreensupreme.com.ourproducts:html:published Jul. 12, 2012, accessed on Mar. 6, 2017.
Egg, whole,raw, fresh form composition of Foods Raw, Processed, Prepared , USDA National Nutrient Database for Standard Reference, Release 22, Sep. 2009,; available at :http:// www.ars.usda.gov/northweast-area/beltsville-human-nutrition-research-center/nutrient-data-laboratory/docs/sr22-download-files/: access on Oct. 17, 2017.
Swiss chard, What's New and Beneficial About Swiss Chard: The World's Healthiest Foods; available at : http://web.archive.org/web/20130117060212/http://www.whfoods.com/genpage.php?tname=foodspice&dbid=16;published on Jan. 17, 2013: accessed on 10/19/20174.
Singh et al., Effect of Corn Oil on Thin Stillage Evaporators,Cereal Chemistry, pp. 846-849, 1999.
Blog, Birdworms & Buttermilk, Extracting Chlorophyll from Leafy Greens; available at: http://birdworms.com/2010/06/26/extractingchlorophyllfromleafygreens/; accessed on Oct. 6, 2016; published on Jun. 2010.
Gonzalez-Martin, Use of NIRS technology with a remote reflectance fibre-optic probe for predicting mineral composition(Ca, K, P, Fe, Mn, Na, Zn), protein and moisture in alfalfa; Anal Bioanal Chem (2007) 387:2199-2205.
What Are Enzymes?: published Mar. 7, 2013; available at : https://web.archive.org./webs/20130307025120/hrrp://www.enzyme-facts.com/enzymes.html; accessed on Aug. 11, 2017.
"Hydrocarbon." In The Columbia Encyclopedia, by Paul Lagasse, and Columbia University. 7th ed. Columbia University Press, 2017. http://search.credoreference.com/content/entry/columency/hydrocarbon/0?institutionId=743.
"starch." In The American Heritage (R) Dictionary of the English Language, edited by The Editors of the American Heritage Dictionaries. 5th ed. Houghton Mifflin, 2011. http://search.credoreference.com/content/entry/hmdictenglang/starch/0?institutionId=743.
Kung, A review on silage additives and enzymes, Proceeding of the 59th Minneapolis Nutrition Conference, Sep. 1998; p. 121-135.
Heist, A Guide to Successful Yeast Propagatiion, Ethanol Producer Magazine, 2008.
Dotty 1, New natural medical antibiotic; Chlorophyll & Spinach, available at http://www.acne.org/messageboard/topic/254668-new-natural-medical-antibiotic-chlorophyllspinach/; published Nov. 30, 2009; accessed on Jul. 3, 2017.
Spinach, vol. 1, No. 14, University of the District of Columbia, Center for Nutrition, Diet and Health, published Jan. 23, 2014, accessed on Jul. 30, 2017, available at: https://web.archive.org/web/20140123214335/https://www.udc.edu/docs/causes/online/Spinach%2014.pdf.
Shamina Z. et al., "Variation of Protease Production by the Bacteria (*Bacillus fastidiosus*) and the Fungus (*Aspergillus funiculosus*)", Journal of Microbiology Research [online], 2013 [retrieved on Oct. 17, 2016], vol. 3, issue 4, retrieved from the Internet: <DIO: 10.5923//j.microbiology.2013030402>, pp. 135-142, see entire documents, especially p. 135.
International Search Report from PCT/US16/38436 dated Oct. 31, 2016.
The International Search Report dated Dec. 18, 2018, for International Application No. PCT/US18/56340.
The Office Action for Canadian Patent Application No. 2,951,715 dated Jul. 9, 2019.
The Office Action for Brazilian Patent Application No. BR112015003793-3 dated Jul. 23, 2019.
The Office Action dated May 9, 2019 for Canadian Patent Application No. 2,882,173.
The Brazilian Office Action for Patent Application No. BR112017016172-9 dated 26, 2019.
The Brazilian Office Action for Patent Application No. BR112017027884-7 dated Jan. 2, 2020.
The International Preliminary Report form PCT Application No. PCT/US2018/056340, dated Apr. 30, 2020.
The Chinese Office Action dated Jun. 3, 2020 for Chinese Patent Application No. 201680007372.4.
Gese Success, Letters Educational, UK, 2006, p. 19 (Year: 2006).

(56) References Cited

OTHER PUBLICATIONS

The Office Action for the Argentina Patent Application No. 20160101901 dated Aug. 19, 2020.
The Brazilian Office Action dated Aug. 8, 2020 for Brazilian Patent Application No. BR112017004017-4.
Labedz et al., Precise Mass Determination of Single Cell With Cantilever-Based Microbiosensor System, PLOS ONE, http://doi.org/10.137/journal.pone.018838, Nov. 21, 2017, pp. 1-14.

\* cited by examiner

METHOD OF MAKING ANIMAL FEEDS FROM WHOLE STILLAGE

CROSS-REFERENCE TO RELATED APPLICATION(S)

This application is a continuation-in-part (CIP) patent application of the U.S. patent application Ser. No. 15,187,702, filed Jun. 20, 2016 and titled, "A METHOD OF AND SYSTEM FOR PRODUCING A HIGH VALUE ANIMAL FEED ADDITIVE FROM A STILLAGE IN AN ALCOHOL PRODUCTION PROCESS" and also claims priority under 35 U.S.C. § 119(e) of the U.S. Provisional Patent Application Ser. No. 62/927,606, filed Oct. 29, 2019 and titled, "A SYSTEM FOR AND METHOD OF SEPARATING FOUR TYPES OF ANIMAL FEEDS FROM GRAINS THAT ARE USED IN THE ALCOHOL PRODUCTION," which are hereby incorporated by reference in their entirety for all purposes.

FIELD OF THE INVENTION

The present invention relates to methods of and devices for dry milling alcohol production systems. More specifically, the present invention relates to methods of and systems for producing at least four types of animal feed from whole stillage in dry grinding ethanol plants.

BACKGROUND OF THE INVENTION

FIG. 1 illustrates a typical wet milling process for alcohol production. FIG. 2 illustrates a typical dry milling process with a backend oil recovery system. FIG. 3 illustrates a typical dry milling process with a back end oil and protein recovery system. FIG. 4 illustrates a typical dry milling process with a front-end milling and front oil recovery system. FIG. 5 illustrates a typical dry mill process with backend milling and backend oil recovery.

The conventional methods of producing various types of alcohols from grains generally follow similar procedures depending on whether the process is operated wet or dry. Wet milling corn processing plants convert corn grain into several different co-products, such as germ (for oil extraction), gluten feed (high fiber animal feed), gluten meal (high protein animal feed), and starch-based products such as ethanol, high fructose corn syrup, or food and industrial starch. Dry grind ethanol plants convert corn into two products, namely ethanol and distiller's grains with soluble. If sold as wet animal feed, distiller's wet grains with soluble is referred to as WDGS. If dried for animal feed, distiller's dried grains with soluble is referred to as DDGS. In the standard dry grinding ethanol process, one bushel of corn yields approximately 16.5 lbs. of DDGS in addition to the approximately 2.8 gal of ethanol.

These co-products provide a critical secondary revenue stream that offsets a portion of the overall ethanol production costs. DDGS is sold as a low value animal feed even though the DDGS contains 10.5% oil and 32% protein. Some plants have started to modify the typical process to separate the valuable oil and protein from DDGS. Currently, there are about 150 plants with the back end oil recovery systems that use a process similar to what is disclosed in a patented process (U.S. Pat. No. 7,601,858, which is incorporated by reference in its entirety for all purposes), and five plants with protein recovery system using a process that is disclosed in U.S. Pat. No. 8,778,433, titled "METHODS FOR PRODUCING A HIGH PROTEIN CORN MEAL FROM A WHOLE STILLAGE BYPRODUCT AND SYSTEM THEREFORE," which is incorporated by reference in its entirety for all purposes, and more than 45 plants that are operated with a front grinding mill in the process disclosed in the U.S. Pat. Nos. 9,012,291 and 9,689,003, titled "DRY GRIND ETHANOL PRODUCTION PROCESS AND SYSTEM WITH FRONT END MILLING METHOD," which are incorporated by reference in their entirety for all purposes, to increase an alcohol yield of the plant as well as to recover valuable oil from the front end.

Backend grinding is further developed to increase oil and protein. Some of which are disclosed in the U.S. Pat. No. 9,388,475, titled "A SYSTEM FOR AND METHOD OF SEPARATING OIL AND PROTEIN FROM GRAINS USED FOR ALCOHOL PRODUCTION." The enriched syrup process is also developed to produce a high lactic acid concentration with $10^{\wedge 9}$ CFU unit probiotic culture in syrup as disclosed in the U.S. Provisional Patent Application No. 62/184,768 titled "A METHOD OF AND SYSTEM FOR PRODUCING A HIGH VALUE ANIMAL FEED ADDITIVE FROM whole STILLAGE IN AN ALCOHOL PRODUCTION PROCESS." A multi zoned screen apparatus for separate fiber from protein is also developed as disclosed in U.S. Pat. No. 9,718,006. The above are all incorporated by reference in their entirety for all purposes.

With respect to the wet milling process, FIG. 1 shows a flow diagram of a typical wet milling ethanol production process 10. The process 10 begins with a steeping Step 11 in which corn is soaked for 24 to 48 hours in a solution of water and sulfur dioxide in order to soften the kernels for grinding, leaches soluble components into the steep water, and loosens the protein matrix with the endosperm. Corn kernels contain mainly starch, fiber, protein, and oil. The steeped corn (after the steeping step 11) with about 50% DS is then fed to a determination milling step (first grinding) 12 at a grinding mill in which the corn is ground in a manner that tears open the kernels and releases the germ, so as to make a heavy density (8 to 9.5 Be) slurry of the ground components—primarily a starch slurry. This is followed by a germ separating step 13 by flotation and the use of a hydro cyclone(s) to separate the germ from the rest of the slurry. The germ is the part of the kernel that contains the oil in corn. The separated germ stream (separated out as a germ byproduct), which contains some portion of the starch, protein, and fiber, goes to germ washing to remove starch and protein, and then to a dryer to produce about 2.5 to 3 lbs. (dry basis) of germ per bushel of corn. The dry germ has about 50% oil content on a dry basis.

The remaining slurry, which is now devoid of germ, but containing fiber, gluten (i.e., protein), and starch, is then subjected to a fine grinding Step (second grinding) 14 at a fine grinding mill where there is a total disruption of endosperm. Endosperm components are released at the step 14, including gluten and starch, from the fiber. This is followed by a fiber separation at a step 15 where the slurry is passed through a series of screens in order to separate the fiber from starch and gluten. The fiber at the step 15 is washed and is clean without gluten and starch. The fiber separating step 15 typically employs static pressure screens or rotating paddles mounted in a cylindrical screen (Paddle Screens). Even after washing, the fiber from a typical wet grinding mill contains 15 to 20% starch. This starch is generally sold with the fiber as animal feed. The remaining slurry, which is now devoid of fiber, is subjected to a gluten separation step 16, in which centrifugation separates starch from the gluten. The gluten stream goes to a vacuum filter followed by a drying step 16A at a dryer to produce gluten (protein) meal.

The starch from the starch gluten separating step 16 normally goes through a jet cooker to start the process of converting the starch to sugar. Jet cooking refers to a cooking process that is performed at elevated temperatures and pressures. The elevated temperatures and pressures can vary widely. Typically, jet cooking occurs at a temperature about 120 to 150° C. (about 248 to 302° F.) and a pressure about 8.4 to 10.5 kg/cm$^2$ (about 120 to 150 lbs./in$^2$), although the temperature can be as low as about 104 to 107° C. (about 220 to 225° F.) when a pressure of about 8.4 kg/cm$^2$ (about 120 lbs./in$^2$) is used. This is followed by a liquefying and scarifying step 17, a fermenting step 18, a yeast recycling and distilling/dehydrating step 19. Liquefaction occurs as the mixture, or "mash" is held at 90 to 95° C. in order for alpha-amylase to hydrolyze the gelatinized starch into maltodextrins and oligosaccharides (chains of glucose sugar molecules) to produce a liquefied mash or slurry. In the saccharifying step 17, the liquefied mash is cooled to about 50° C. and a commercial enzyme known as gluco-amylase is added. The gluco-amylase hydrolyzes the maltodextrins and short-chained oligosaccharides into single glucose sugar molecules to produce a liquefied mash. In the fermenting step 18, a common strain of yeast (*Saccharomyces cerevisiae*) is added to metabolize the glucose sugars into ethanol and $CO_2$.

Upon completion, the fermentation mash ("beer") contains about 17% to 18% ethanol (volume/volume basis). Subsequent to the fermenting step 18 is the distilling and dehydrating step 19, in which the beer is pumped into distillation columns where it is boiled to vaporize the ethanol. The ethanol vapor is condensed in the distillation columns, and liquid alcohol (in this instance, ethanol) exits the top of the distillation columns at about 95% purity (190 proof). The 190 proof ethanol then goes through a molecular sieve dehydrating column, which removes the remaining residual water from the ethanol to yield a final product of essentially 100% ethanol (199.5 proof). This anhydrous ethanol is now ready to be used for motor fuel purposes. The solids and some liquid remaining after distillation go to an evaporating step 20, wherein yeast can be recovered as a byproduct. Yeast can optionally be recycled back to the fermenter at the fermenting step 18. In some instances, the $CO_2$ is recovered and sold as a commodity product.

No centrifugation step is necessary at the end of the wet milling ethanol production process 10 as the germ, fiber and gluten have already been removed in the previous separating steps 13, 15, and 16. The "stillage" produced after the distilling and dehydrating step 19 in the wet mill process 10 is called a "syrup."

The wet grinding process 10 can produce a high quality starch product for conversion to alcohol, as well as separate streams of germ, fiber and protein, which can be sold as by-products to generate additional revenue streams. However, the wet grind process is complicated and costly, requiring high capital investments as well as high-energy costs for operation.

Because the capital costs of wet grinding mills can be expensive, some alcohol plants prefer to use a simpler dry grinding process. FIG. 2 is a flow diagram of a typical dry grinding ethanol production process 20. As a general reference point, the dry grinding ethanol process 20 can be divided into a front end and a back end process. The part of the process 20 that occurs prior to distilling 24 (e.g., at a distiller/distillation equipment) is considered the "front end", and the part of the process 20 that occurs after distilling 24 is considered the "back end." The front end process of the process 20 begins with a grinding step 21 in which dried whole corn kernels are passed through hammer mills to be ground into corn meal or a fine powder. The screen openings in the hammer mills are typically of a size 7, or about 2.78 mm, with the resulting particle distribution yielding a very wide spread, bell type curve particle size distribution, which includes particle sizes as small as 45 micron and as large as 2 to 3 mm. The ground meal is mixed with water to create slurry, and a commercial enzyme called alpha-amylase is added (not shown). This slurry is then heated to approximately 120° C. for about 0.5 to three (3) minutes in a pressurized jet cooking process 12 in order to gelatinize (solubilize) the starch in the ground meal. It is noted that in some processes a jet cooker is not used and a longer holding time is used instead.

The grinding step 21 is followed by a liquefying step 22 whereat ground meal is mixed with cook water to create slurry and a commercial enzyme called alpha-amylase is typically added (not shown). The pH is adjusted here to about 5.8 to 6 and the temperature is maintained between 50° C. to 105° C. so as to convert the insoluble starch in the slurry to soluble starch. The stream after the liquefying step 22 has about 30% dry solids (DS) content with all the components contained in the corn kernels, including sugars, protein, fiber, starch, germ, grit, and oil and salt, for example. There are generally three types of solids in the liquefying stream: fiber, germ, and grit, with all three solids having about the same particle size distribution. The liquefying step 22 is followed by a simultaneous saccharifying and fermenting step 23. This simultaneous step is referred to in the industry as "Simultaneous Saccharification and Fermentation" (SSF). In some commercial dry grinding ethanol processes, saccharification and fermentation occur separately (not shown). Both individual saccharification and SSF can take as long as about 50 to 60 hours. Fermentation converts the sugar to alcohol using a fermenter. Subsequent to the saccharifying and fermenting step 23 is a distilling (and dehydration) step 24, which utilizes a still to recover the alcohol.

Next, the back end of the process 20, which follows distilling 24, includes a fiber separating step 25, which involves centrifuging the "whole stillage" produced with the distilling step 24 to separate the insoluble solids ("wet cake") from the liquid ("thin stillage"). The "wet cake" includes fiber (pericarp, tip cap, and fine fiber), grit, germ particle and some protein. The liquid from the centrifuge contains about 6% to 8% DS, which contains mainly oil, germ, fine fiber, fine grit, protein, soluble solid from the fermenter and ash from corn. Some plants' whole stillage with about 12 to 14% DS is fed to a first stage evaporator, wherein the whole stillage is concentrated to 15 to 25% DS before feeding to a fiber separating step 25.

The thin stillage is split into two streams, about 30 to 40% flow recycles back ("back set") to mix with corn flour in a slurry tank at the beginning of the liquefying step 22. The rest of the flow (about 60 to 70% of total flow) then enters evaporators in an evaporating step 27 to boil away moisture, leaving a thick syrup that contains the mainly soluble (dissolved) solids from fermentation (25% to 40% dry solids). The back-set water is used as part of cook water in liquefying step 22 to cut the fresh water consumption as well as save evaporating energy and equipment costs.

The concentrated slurry from the step of evaporating 27 is able to be subjected to an optional oil recovering step 26, whereat the slurry can be centrifuged to separate oil from the syrup (U.S. Pat. No. 7,601,858 is incorporated by reference in its entirety for all purposes). The oil can be sold as a separate high value product. The oil yield is normally about 0.4 lbs./Bu of corn with high free fatty acids content. This oil yield recovers only about ¼ of the oil in the corn. About one-half of the oil inside the corn kernel remains inside the germ after the distilling step 24, which cannot be separated in the typical dry grinding process using centrifuges. The free fatty acids content which is created when the oil is held in the fermenter for approximately 50 hours reduces the value of the oil. The (de-oil) centrifuge only removes less than 50% oil in syrup because the protein and oil make an emulsion, which cannot be satisfactorily separated. The addition of chemicals such as an emulsion breaker can improve the separation efficiency in some degrees, but the chemicals are costly and the DDGS product can be contaminated by the added chemicals. Providing heat or raising the feed temperature at the centrifuge to break the emulsion is also used, but it affects the color and quality of DDGS. Adding an amount of alcohol to break the emulsion (U.S. Pat. No. 8,192,627, which is incorporated by reference in its entirety for all purposes) also improves the separation and increases the oil yield, but it needs explosion proof equipment and costly operations. All those improvements can only increase the oil yield from an average of 0.4 lbs./Bu to about average 0.6 lbs./Bu even, while the "free" oil in the whole stillage is about 1 lbs./Bu. The oil/protein forms an emulsion during the whole dry milling process and is the main reason for having a low oil yield in the back end oil system.

An oil and protein recovering process (PCT/US09/45163, which is incorporated by reference in its entirety for all purposes) is developed by using an oil/protein separating step, which is added to break this oil/protein emulsion in the whole stillage. As shown in the process 30 of FIG. 3, the front end process is as simple as the existing dry milling process. The process changes its procedure at a step after fiber separation 25 at the back end process. This oil/protein separation step 31 is added between the fiber separating step 25 and an evaporating step 27. The nozzle centrifuges, other types of disc centrifuges, or disc decanters (WO 2014-082020, which is incorporated by reference in its entirety for all purposes) are normally used for this application. The thin stillage from fiber separating step 25 is fed to the oil and protein separating step 31, which can be performed using a centrifuge. The oil and protein emulsion is broken up in a higher G force inside the centrifuge. The oil goes to a light phase (overflow) discharge and protein goes to a heavy phase discharge (underflow), because of the density difference between oil (density 0.9 gram/ml) and protein (1.2 gram/ml). The light phase (overflow) then is fed to an evaporating step 27 to be concentrated to contain 25 to 40% of DS (forming a semi-concentrated syrup). Next, the semi-concentrated syrup is sent to the backend oil recovering system step 26 to recover oil in the backend. The light phase stream contains less protein, so it has less chance to form oil/protein emulsion. The oil yield with this system can be as high as 0.9 lb./Bu. The de-oil syrup from back end oil recovering step 26 can further be concentrated in an evaporator to a much higher syrup concentration (as high as 75% of DS.) The de-oil syrup with low protein can avoid fouling at the evaporator. The underflow from an oil and protein separating step 31 goes to a protein dewatering step 32 for protein recovery. The separated protein cake from protein dewatering step 32 with a content of less than 3% oil is sent to a protein dryer step 33 to produce a high value protein meal, which has a protein content of 50%. The liquid from the protein dewatering step 32 is sent back to the front end as a back-set liquid that is used as part of cooking water in the liquefying step 22.

All of the oil that is recovered from the backend oil recovery system has poor quality, dark color, and high fatty acid around (15 to 20%), because the oil is in the fermenter more than 50 hours. The backend oil separation is also difficult to be carried out, because the oil and protein form emulsion during whole dry milling process. Each step in the whole dry milling process, such as pump and separation create some oil and protein emulsion. In order to get good quality of oil and avoid the formation of the oil and protein emulsion during the whole dry milling process, recovering oil in the front end is a good solution. The three phase decanters that are used to recover the oil from the liquefied starch stream during the liquefying step are tested. Due to the high viscosity in liquefied starch solution plus most oil still in a germ form, the oil yield is normally low to around 0.2 lbs./Bu. Nonetheless, the oil quality is much better than oil obtained from the back end, which has a much lighter color with about 5 to 9% free fatty acid.

The improved front end oil recovery system (described in PCT/US12/30337, which is incorporated by reference in its entirety for all purposes) is developed to improve the oil yield as well as to increase yield of the alcohol. As shown in the process 40 of FIG. 4 (also described in PCT/US12/30337, which is incorporated by reference in its entirety for all purposes), the two stage liquid and solid separating steps 42 and 44 are followed by two stage dewatering milling steps 43 and 45 in series respectively with a counter current setup. A portion of the cook water is added to the holding tank of a holding step 46 (such as from a solid/liquid separating step 49) instead of adding to the slurry tank of a cooking step 41. In process 40, the cook water is mixed with a cake from the second dewater milling step 45, then the mixture is fed to a third solid/liquid separating step 49 to recover liquid, which is about 2 to 3 degree of Brix. The liquid from the third liquid and solid separating step 49 is then mixed with the cake from the first dewater milling step 43, then to the holding tank 46 for about 4 to 6 hours. The content in the holding tank 46 is then fed to a second solid and liquid separating step 44 to separate the liquid from the solid. The liquid separated at the second liquid and solid separating step 44 has about 6 to 8 Brix, which is now used as part of cook water to be mixed with corn flour from the hammer mill milling step 21, to be sent to the slurry tank of the cooking step 41. Using this counter current washing setup, the germ particle has about double the holding time in the holding tank step 46 resulted in a much lower Brix (around 6 to 8 Brix instead of 25 to 30 Brix) liquefied starch solution. The germ that is soaked in a lower Brix environment and has double the holding time in the liquefying step allows the germ to be softened more easily, such that the germ can be broken up from the shell and to release the oil at the second dewater grind milling step 45. This counter current washing setup process 40 also gives middle size germ particles from the second stage dewater milling 45, which is recycled back to the first dewater milling stage to ensure that the germ particle is milled to become a pre-defined size of the germ particle (such as smaller than 150 micron) to release more oil. All grit/germ/fiber solid particles have a wide range of particle size range from less than 45 micron to as large as 2 to 3 mm. With softening the germ particle in a lower Brix solution with a longer holding tank time, the germ is much softer and easy to be broken up than the fibers. Accordingly, the dewatered milling method can break up more germ particle than fiber. However, each dewatered milling step can only reduce the germ particle size about half of its original size at best. For example, the germ particle of an average size of 1,000 microns becomes about 600 microns in average after one pass of dewatered milling step. For germ particles to release oil, the germ particle size is preferred to be less than 150 microns. Therefore, normally at least two/three stages dewater millings in series are needed to release more oil from the germ particles. The counter current washing setup allows the middle sized germ after second dewater milling step 44 to be recycled back to the first dewater milling step 42 for breaking the germ particles one more time. The screen pore size for the first and second solid and liquid separating steps 42 and 44 is selected to give a desired degree of sizes and recycle the germ particles back to the slurry tank.

After the hammer mill milling step 21, the mixture is optionally sent to the jet cooker for a cooking step 41, the second slurry tank, or more holding tanks. The slurry goes to the first solid and liquid separating step 42, such that the liquid is separated from the solid.

At the first solid and liquid separating step 42, the liquid containing oil and small solid particles (germ, protein, and fine fiber) in liquefied starch solution is sent to the front end oil recovering step 47. The de-water solid (cake) stream containing mostly grit/germ/fiber is sent to the first dewater milling step 43 to break the solid particles (germ/grit/fiber), such that the starch and oil from grit/germ/fiber solid particles are released. Then, the solids from the first dewatering step 43 is mixed with the liquid from the third solid and liquid separating step 49 to be sent to the holding tank for a holding step 46. The back-set only has less than half of the whole cook water, so the solid (germ/grit/fiber) is able to stay in the holding tank more than double a typical holding time and at much lower Brix. The grit/germ/fiber/starch can be quickly and easily softened/broken up with the starch to be liquefied and for oil to be released from the germ particles. After the holding tank of the hooding step 46, the slurry is sent to the second solid and liquid separating step 44 to dewater. The liquid is recycled back to the slurry tank of a cooking step 41 with larger germ particles as part of cook water. The cake from the second solid and liquid separating step 44 goes to the second dewater milling step 45. Subsequently, the cake is mixed with a back-set water to the third solid and liquid separating step 49. The liquid from the third solid and liquid separating step 49 is sent to the holding tank of the holding step 46. The cake from the solid and liquid separating step 49 is sent to the fermenter for a fermenting step 23.

The liquid from the first solid and liquid separating step 42 that contains most of oil in the front end is sent to a front end oil recovery system. The three phase nozzle centrifuge is normally used to separate the oil/emulsion/small germ particle from the liquefied starch solution on an oil separating step 47. The light phase that contains most oil/emulsion/germ particles with a small amount of liquefied starch solution is sent to a small three phase separation centrifuge (decanter or disc centrifuge) to polish and purify oil in the oil purifying step 48. The heavy phase and underflow/cake phase from both a three phase nozzle centrifuge centrifuging step 47 and three phase separation centrifuge step 48 are sent to the fermenting step 23 to be first converted to a sugar then to an alcohol. The "beer" from the fermenter that contains about 15% to 17% alcohol goes to distilling step 24 for alcohol recovery. The whole stillage from the bottom of distilling step 24 has an option to go to the first stage evaporator to be pre-concentrated from a normal 12 to 14% DS to 15 to 25% DS concentration, then followed by a germ cyclone to float any larger germ pieces that are still in the whole stillage (U.S. Provisional Patent Application No. 61/638,455, filed on Apr. 25, 2012 is incorporated by reference in its entirety for all purposes).

The use of the germ cyclone is able to increase the oil yield about 0 to 0.2 lb./Bu depending on the front grind system and the concentration of the concentrated whole stillage and a germ cyclone operating step 46A. The de-germed fiber stream is discharged from the bottom of the germ cyclone or the whole stillage discharged from the bottom of the distillation column are sent to a decanter centrifuge at the fiber separating step 25 to recovery fiber as DDG. The overflow from the decanter is split into two streams: about 30 to 40% flow is used as a back-set and remaining 60% to 70% flow is sent to the evaporator step 27 to be concentrated to about 35% DS as syrup by-product.

The oil recovery at the front end system gives much lighter color and lower fatty acid (about 5 to 9%). The oil yield on the front end is affected by the number of dewater milling stages at the front end and the de-germ system in the back end. With one dewater milling system, the oil yield is about 0.2 to 0.4 lbs./Bu. With two dewater milling stages in series, the oil yield is about 0.3 to 0.5 lbs./Bu. With an additional de-germ system on the back end, the oil yield is about 0.5 to 0.6 lbs./Bu. Not all of the oil is able to be obtained at the front end oil recovery system, because the oil in germ particles can only release less than half of the oil in the front end steps. More oil is released from the germ particles at the back end than at the front end, because the alcohol presented at the back end can act as a solvent to extract more oil out during the fermenting step 23 and/or distilling step 24. An additional back end oil recovering step 26 is needed if higher oil yield is needed.

In addition, if the corn that is used is old or are dried in a high temperature environment, the germ particle softening process becomes very slow during the holding tank softening process. In such case, more enzymes and larger holding tank (to give longer holding time to soften germ) are needed. Above mentioned documents, including patents and patent applications are incorporated by reference in their entirety for all purposes.

The germ particles in liquefying step do not absorb water and so are not easy to break on dewater milling step 42 and 44. The germ particle sizes normal decrease to half of it size after dewater milling step. So more than half of oil inside the corn kernel is still inside the germ (the oil drops are protected by protein cell walls) and is not released out during front dewater milling step 43 and 45, which is because the germ particles in the liquefying step still have not completely absorbed water and softened enough to be broken by a grinding mill. The germ particles after fermenting step 23 and distilling step 24 absorb water completely and are easy to break by using a grinding mill, so it can be achieved by moving one of the dewater grind milling step 45 and solid and liquid separating step 49 in the front end to the back end (after distilling 24) to break the germ particles to release more oil.

The corn price has increased rapidly in the recent years. Thus, the capability of increasing oil yield in the dry milling industry has become an important subject. The existing back end oil recovery system as described in process 20 in FIG. 2 has a yield that produces around 0.4 to 0.6 lb./Bu oil. The modified back end oil in conjunction with a process of protein recovery as described in the process 30 in FIG. 3 can produce around 0.8 lb./Bu oil. The front oil recovery system without a back end oil recovery system can have a yield of 0.5 lb./Bu oil, while the front end oil recovery system with a back end oil recovery system can have a yield of 1.1 lb./Bu, which is described in the process 40 in FIG. 4.

The backend milling process in the U.S. Pat. No. 9,388, 475 discloses how to improve front end oil recovery and back end oil recovery, which can have a maximized oil yield to 1.4 lb./Bu. The above process also provides more valuable byproducts including white fiber (which can be used for a secondary alcohol production and paper industry) and high value protein meal (gluten meal, spent yeast and germ protein).

As shown in the FIG. 5, the corn goes through a hammer mill milling step 22, a liquefying step 23, a fermenting step 23, and a distilling step 24 as part of a typical front-end dry milling system. The whole stillage after distilling step 24 is sent to a liquid and solid separating step 52, wherein the solid phase has coarse solids (containing mainly fiber, germ and grit) and the liquid phase has fine solid (mainly fine fiber, and protein) with oil and other liquid substances. The coarse solids portion is sent to a dewater milling step 51 to break up germs and grits to release oil and starch. The ground solids are sent to a fiber and protein separating step 53. The back set and fresh cook water are used as washing liquid to wash fiber of all broken germs and grits, which is sent back as cook water to the liquefying step 22 for increasing alcohol and oil yield for a second round. The washed fiber can be used for a secondary alcohol production or to be further purified at a fiber purifying step 58 to produce white fiber, which can be used as a paper industry feed stock or for other processes. The liquid and fine solids portion from a liquid and solid separating step 52 is sent to an oil and protein separating step 55. The protein rich stream from the oil and protein separating step 55 is sent to a protein dewatering step 32 to produce a protein cake, which contains 45 to 50% of protein. The yield of a protein meal can be up to 6 lb./Bu. The overflow from the protein dewatering step 32 is used as a back-set stream. The oil rich stream from the oil and protein separating step 55 is sent to an evaporator at a evaporating step 27 to be concentrated to a syrup with around 30% to 40% of DS, which is then followed by an oil recovering step 57 to recover oil having a yield up to 1.4 lb/Bu. This backend milling system will increase alcohol yield up to 3% and a yield of protein meal (with 50% protein) up to 6 lb./Bu with 1.4 lb./Bu of oil The de-oiled syrup from the evaporating step 27 is sent to a syrup enriching step 59. An amount of lactic acid producing probiotic culture are added to the de-oiled syrup to perform a secondary fermentation to convert sugar to lactic acid and produce enriched syrup, which has 20% lactic acid (in DB) and $10^{\wedge 9}$ CFU probiotics in the enriched syrup.

SUMMARY OF THE INVENTION

The process disclosed herein maximizes the uses of all components in the whole stillage to produce animal feed for various type of animals. In some embodiments, alcohol producing processes with a backend grinding system is used to produce four types of animal feed, including:
1) A first animal feed formulated and prepared for cow or other ruminant animals: containing mainly pericarp and tip cap inside corns. The first animal feed contains mainly coarse fiber with 10 to 20% of protein and less than 4% of oil.
2) A second animal feed formulated and prepared for chicken and/or pig. The second animal feed contains mainly fine fiber, zein protein inside corn, and de-oiled germ protein having some fine fiber. The second animal feed contains 40 to 45% of protein and less than 4% of oil.
3) A third animal feed formulated and prepared for fish and pet. The third animal feed contains mainly spent yeast protein, germ, protein, and zein protein inside of the corns. The third animal feed contains 45 to 50% of protein and less than 4% of oil.
4) A fourth animal feed formulated and prepared having an enriched syrup as part of baby animal milk diet or for animal nutritional supplement. The fourth animal feed is formulated to be rich in mineral (from inside of the corns), nutrients (from inside of the yeast cell), and up to 20% of lactic acid (in DB) and $10^{\wedge 9}$ CFU (e.g., 100 million CFU) probiotics unit.

The Present Specification provides the most efficient methods to produce above mentioned four types of animal feeds using a whole stillage. For example, FIG. 6 illustrates one of the exemplary embodiments for producing the animal feeds.

In the FIG. 6, the front-end process (from a milling step 21 of corns to a distilling step 24) can use the same or similar process/equipment like those used in a typical commercial dry milling process. Still referring to the FIG. 6, the whole stillage is sent to a selective particle separating step 61, which produces three streams:

a) a first stream having larger solids, wherein the first stream contains mainly pericarp, tip cap, germ, and grit. The first stream is produced as dry as possible.

b) a second stream having fine fibers and zein proteins (zein protein is inside the corn) having a much higher concentration.

c) a third stream having spent yeast, fine germ, and proteins in its purest form. Multi-screens (with various screen sizes and types of open slots), one or more paddle screens, one or more pressure screens, one or more vibration screens with multistage in series, or a combination thereof can be used herein.

More detailed descriptions of the above three streams are disclosed below.

First Animal Feed for Cows or Other Ruminant Animals

In some embodiments, the first animal feed is used for feeding cows or other ruminant animals. The first animal feed can be made using the first stream mentioned above. The first stream (e.g., having larger solids: fibers, germs, and grits) from the selective particle size separating step 61 is sent to perform a dewater milling at a selective milling step 51. At the selective milling step 51, germ and grit particles are broken up to release starch, protein, and oil.

A fiber washing step 68 receives a resultant from the selective milling step 51. The fiber washing step 68 washes the fibers and removes broken grit and germ particles by using the back-set stream and an amount of fresh cook-water as a washing liquid. The washing liquid releases starch, protein, oil, germ and/or a combination thereof, wherein the washing liquid is sent back to a liquefying step 22 to produce more alcohol (increase alcohol yields up to 3%), increase oil yield up to 1.4 lb./Bu, and increase a protein yield up to 7 lb/Bu. The washed fiber at the fiber washing step 68 has less than 20% of protein and less than 4-5% of oil, which is ideal to be used for cow feeding.

A Second Animal Feed for Chickens and Pigs

The second stream (e.g., the middle size particle stream), which contains mainly fine fiber and zein protein inside corn). The second stream is a slurry from the selective particle size separating step 61, which is sent to a protein dewatering step 62 to produce a protein cake. The protein meal contains 40 to 50% of protein. The yield of protein is 2.5 to 4.5 lb./Bu, which can be used as the second animal feed for chickens and pigs.

A Third Animal Feed for Fish and Household Pets

An overflow from the protein dewatering step 62 contains some yeast and fine germ protein that is combined with a fine protein stream from the selective particle size separating step 61 as a combing step 62A.

The third stream (e.g., fine protein stream) including the overflow from the combining step 62A contains mainly yeast protein, fine germ protein, and oil. The third stream is sent to an oil and protein separating step 65 to produce an oil-rich stream (overflow) and a protein rich stream (underflow).

At the oil and protein separating step 65, the underflow (protein-rich stream) is sent to a protein dewatering step 63 to produce a high quality protein meal, which contains 45 to 50% of protein with good amino acid distribution up to 3 lb./Bu of a yield, which is formulated and prepared for fish and household pet diet.

A Fourth Animal Feed having an Enriched Syrup as Part of Baby Animal Milk Diet or for Animal Nutritional Supplement The oil-rich stream from the selective particle size separating step 61 (via oil and protein separating step 65) is sent to an evaporator of an evaporating step 27 to produce a syrup with 30 to 40% of DS. This syrup from the evaporating step 27 is sent to an oil recovering step 57 to produce up to 1.4 lb./Bu of oil.

At the oil recovering step 57, the de-oil syrup contains the de-oiled syrup sent to a syrup enriching step 59 via the evaporating step 27. At the syrup enriching step 59, a lactic acid produced probiotic culture is added to the de-oiled syrup to perform a secondary fermenting to convert residual sugars to lactic acid and an enriched probiotic product containing probiotics up to $10^9$ CFU unit. Related U.S. provisional patent application 62/184,768 is incorporated by reference in its entirety for all purposes.

At the syrup enriching step 59, this enriched syrup contains all the minerals found inside the corn, vitamins inside the yeast cell, all soluble proteins, up to 20% of lactic acid (in DB base), and $10^9$ CFU probiotic unit. In some embodiments, this enriched syrup can be further concentrated up to 85% of DS by using a low temperature vacuum evaporator at a low temperature evaporating step 64. At the low temperature evaporating step 64, a waste heat recovery system (see FIG. 15) uses a high temperature waste heat stream from a dryer as a heat source, which uses saved energy. The enriched syrup at the low temperature evaporating step 64 is able to be applied to and sprayed on any other dry animal feed to produce a higher than 10% moisture of a finished animal feed product, which can be stored in room temperature for a long time without spoiling due to salt, sugar, and lactic acid content inside the enriched syrup. This enriched syrup can be used to make a baby animal food formula, which also can be used as a bonding agent on pellet/tub step for all pellet/tub animal feed. The enriched syrup can also be used to make a drinking water formula for all animals. This enriched syrup with a low pH and a high glycerol content (keep plant leaf wet) also can used as an organic and natural plant-insects repellent to keep bugs away from young plants. The enriched syrup can also be used as an organic fertilizer for plants, because of the high $K^+$, and $P^+$ content in the enriched syrup. Further, the low pH enriched syrup with the high lactic acid and glycerol content also can be used as a soil conditioner and keep soil wet for plants to grow better. This 85% DS (dry solid) enriched syrup also can be used as a natural and organic wet animal feed preserver. The data shows mixing a 85% DS enriched syrup with a wet protein cake (25% DS) in one to one ratio to form a high nutritional value wet animal feed with 55% DS only. This moisturized wet feed can keep at 40 C (104 F) temperature for four months without spoiling. Thus, this enriched syrup can be added to dry feed in a typical dry feed system as part of a feed supplement, because the enriched syrup has probiotic culture up to $10^9$ CFU unit and lactic acid.

BRIEF DESCRIPTION OF THE DRAWINGS

Embodiments will now be described by way of examples, with reference to the accompanying drawings which are meant to be exemplary and not limiting. For all figures mentioned herein, like numbered elements refer to like elements throughout.

DETAILED DESCRIPTION OF THE PREFERRED EMBODIMENT

Figure 1:
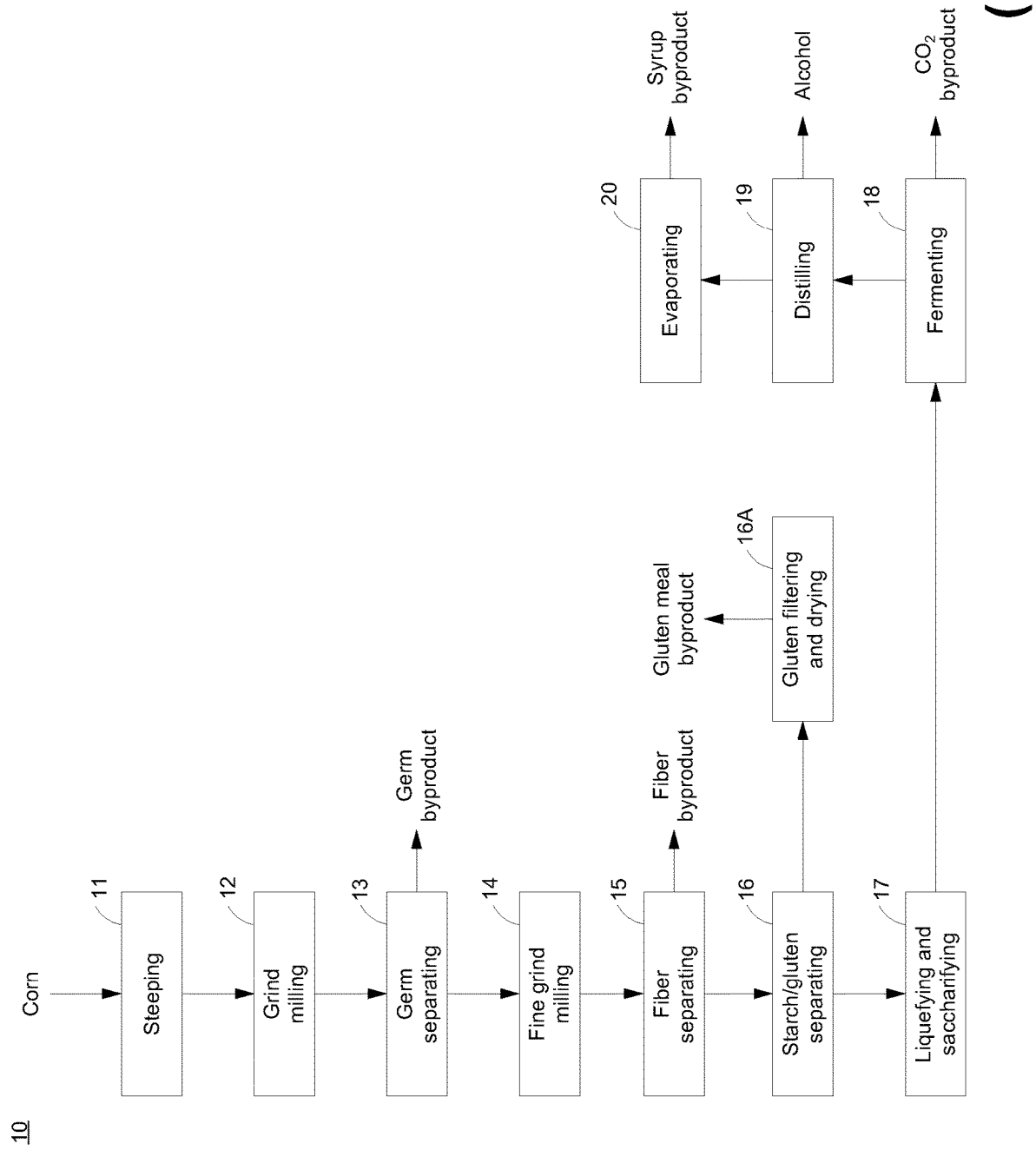
FIG. 1 illustrates a typical wet milling process and system for producing ethanol and distiller's grains with soluble.

Reference is made in detail to the embodiments of the present invention, examples of which are illustrated in the accompanying drawings. While the invention is described in conjunction with the embodiments below, it is understood that they are not intended to limit the invention to these embodiments and examples. On the contrary, the invention is intended to cover alternatives, modifications and equivalents, which can be included within the spirit and scope of the invention as defined by the appended claims. Furthermore, in the following detailed description of the present invention, numerous specific details are set forth in order to more fully illustrate the present invention. However, it is apparent to one of ordinary skill in the prior art having the benefit of this disclosure that the present invention can be practiced without these specific details. In other instances, well-known methods and procedures, components and processes have not been described in detail so as not to unnecessarily obscure aspects of the present invention. It is, of course, appreciated that in the development of any such actual implementation, numerous implementation-specific decisions must be made in order to achieve the developer's specific goals, such as compliance with application and business related constraints, and that these specific goals vary from one implementation to another and from one developer to another. Moreover, it is appreciated that such a development effort can be complex and time-consuming, but is nevertheless a routine undertaking of engineering for those of ordinary skill in the art having the benefit of this disclosure.

A typical dry milling alcohol plant produces only one byproduct of alcohol, which is called DDGS. DDGS normally contains about 29% to 31% of protein, 11% to 13% of oil, and 4% to 6% of starch. Further, the DDGS yield is about 15 to 16 lb./Bu, which contains around 4.6 lb./Bu of protein, 1.9 lb/Bu of oil and 0.8 lb./Bu of starch inside the DDGS. Nonetheless, DDGS has a low sale price even with a high protein and oil content. The reasons include that there are too many fibers inside, which makes the DDGS only suitable for ruminant animals, such as a cow. In other words, DDGS is not suitable for monogastric animals, such as chicken or fish.

In the present disclosure, a method of separating the components/ingredients of the DDGS, such that the separated components have a higher purity. By doing so, the separated components as a byproduct of an alcohol producing process has a higher purity, which enhances the value of the byproducts. The byproducts can be used for various applications and industries, including for the paper industry for making water resistant pulp and secondary alcohol feed stock, which contains white fiber (less than 10% of protein, less than 3% of oil, and less than 2% of starch). Further, the byproducts can be used to make a nutritious animal feed containing a coarse protein meal (more than 40% of protein, less than 4% of oil, and less than 2% of starch), fine protein meal (more than 45% of protein, less than 3% of oil, and less than 1% of starch), corn oil, and an enriched syrup. There are five major parts/components found in the DDGS, which is listed in the following:

Part I: a larger solid particle portion (larger than 400 micron size), which are a combination of fibers (e.g., pericarp, and tip cap) bonded with some protein and starch, grits (e.g., fine fiber bonded with protein and starch), and germ particles which has oil drops protected by protein cell wall inside the germ. The Part I's yield is about 6 lb./Bu having a composition of 28% of protein, 8% of oil and 4% of starch.

Part II: a coarse protein portion containing mainly zein protein with some fine fiber, which is bonded with starch. Part II contains insoluble solid with a density of 1.1. The particle size is in the range of 50 microns to 500 microns. The yield is about 4 lb./Bu having a composition of 45% of protein, 5% of oil, and 2% of starch.

Part III: an exceptionally fine germ pastes and spent yeast portion. Part III has a density around 1 and a particle size range from submicron to 50 microns. The yield of Part III is about 2.5 lb./Bu having a composition of 45% of protein, 30% of oil, and 2% of starch.

Part IV: a soluble solid portion containing inorganic salts in corn, sugar, fermentation byproducts including lactic acid, glycerol, and acetic acid. The yield is about 4 lb./Bu having a composition of 10% of protein, 7% of oil, and 5% of starch.

Part V: "Free" oil portion. The oil can be recovered by using one or more centrifuges. The yield is about 1 lb./Bu.

Nonetheless, the typical DDGS is not a valuable byproduct, because all the compounds are cross contaminated with each other. Thus, methods, processes, and devices are used to isolate, purify, and/or separate valuable ingredients for making the animal feed.

In some embodiments, a method is disclosed to break up the mixture of the components better, which can result in a sharper/better separation and produce purer resultants. Therefore, the resultants can become a more valuable byproduct, such as having a purer composition. For example, a purer corn oil, purer coarse protein meal (more than 45% of protein, less than 3% of oil, and less than 2% of starch), purer fine protein meal (more than 45% of protein, less than 3% of oil, and less than 1% starch, purer white fiber (less than 15% of protein and less than 3% of oil), and a nutrient enriched syrup. The present disclosure provides a method of producing four animal feeds to fit for various types of animals and to provide a much purer valuable byproduct.

In some embodiments, six additional features, steps, processes, and/or devices are used with typical dry mill processes/plants. The present disclosure, in accordance with some embodiments, provide much sharper separation between fiber, protein, and oil, which in turn produce much purer and more valuable byproducts (e.g., low protein fiber feed, coarse protein gluten meal, special high ratio of protein with spent yeast and germs, and enriched syrup for various animal feeds.) The above mentioned six additional features are disclosed in the following and in the FIG. 6:

(1) Selective particle separating (step 61): the whole stillage is sent to the step 61 of selective particle separating to separate insoluble solid into three parts a) coarse fiber (e.g., pericarp and tip cap), germs, and grits; b) fine fiber and coarse Zein protein; and c) fine protein (e.g., spent yeast and germ protein.)

(2) Dewater milling (step 51): there are more than 2 lb./Bu of germs unbroken and about 1 lb./Bu grits (e.g., starch that are bonded with fine fiber and protein) in the whole stillage. Those de-watered particles are sent to dewater milling at the step 51 to be broken up, so that oil, starch and protein inside the germs and grits are released.

(3) Fiber washing (step 68): the solids from dewater milling step 51 are fed to the fiber washing step 68. The back-set stream and fresh cook water are used as a washing liquid to wash the fiber and remove broken germs and grits, and the back-set stream is sent back to the liquefying step 22 as cook water. The yield of alcohol increases up to 3% and the yield of oil increases up to 1.4 lb./Bu. The washed fiber is in a more fiber form (less than 15% of protein, less than 4% of oil, and less than 2% of starch). The washed fiber can be used as a cow feed or a secondary alcohol feed stock or for cellulose processes.

(4) Coarse Zein protein meal (step 62): the course zein protein with fine fiber from the selective particle separating step 61 is sent to a protein dewatering step 62 to produce up to 5 lb./Bu gluten meal, with around 45% of protein, less than 3% of oil, and less than 2% of starch, which is an ideal feed for chicken and pig.

(5) Breaking oil and protein emulsion and extra clean thin stillage (step 65): with the removal of the coarse protein before the oil and protein separating step 65, the solids loading in this oil and protein separating step 65 is reduced by more than 50%. The oil rich stream (thin stillage) contains less than 2.0% by volume of solids as compared with 7% of solid by volume. So, this extra clean oil-rich stream is concentrated up to 85% of DS in an evaporator instead of the normal 35% of DS. This higher concentration syrup saves energy and cuts DDGS dryer load, and even can by-pass/not use a dryer. The protein rich stream is sent from the oil and protein separating step 65 to a protein dewatering step 63 to produce high protein meal (50% of protein, 3% of oil, and less than 2% of starch), which is ideal for pet and fish food diet.

(6) Enriched syrup with low temperature evaporating (step 59): de-oiled syrup from the oil recovering step 57 is sent to the syrup enriching step 59 to convert residual sugar to lactic acid by adding an amount of lactic acid probiotic culture, such as *Lactobacillus plantarum* ZJ316, *Lactobacillus amylovorus*, *Lactobacillus fermentum*, and *Lactobacillus mucosae*. This constitutes a secondary fermentation, which produces up to 20% (in DB) of lactic acid and $10^9$ CFU probiotic unit. This enriched system can be concentrated up to 85% of DS syrup by using a low temperature vacuum evaporator to avoid using a high temperature, since high temperature destroys valuable nutrients inside the syrup. In some embodiments, this highly concentrated syrup can by-pass dryer and is added to dry feed after the drying step to form a "wetter" (more than 10% moisture), "spoilless" (can keep at room temperature for long time "higher nutrient value" "probiotic" animal feed products. This 85% of DS enriched syrup also can be used as an animal food supplement, as part of a baby animal milk, and/or an animal drinking water formula.

Figure 13:
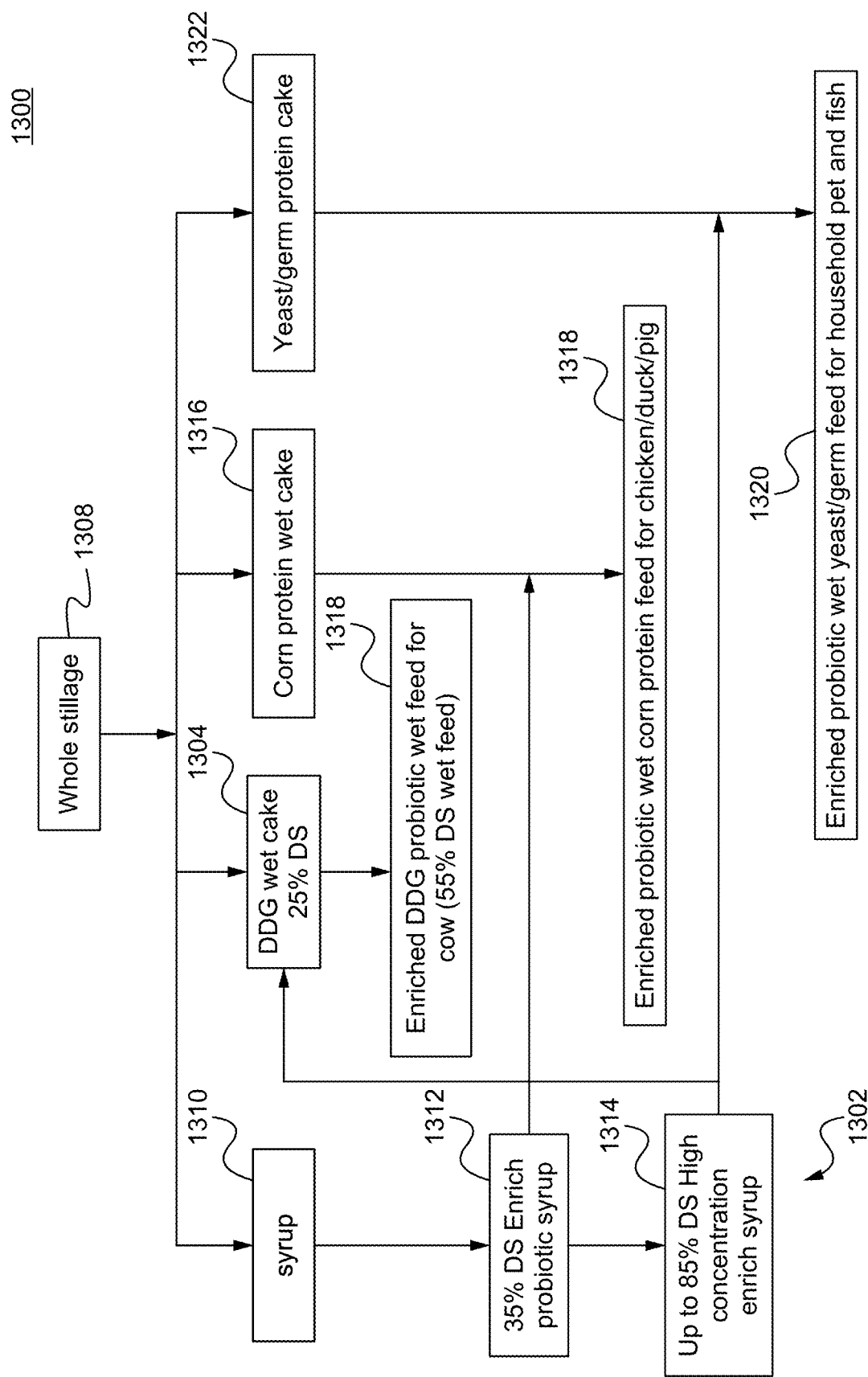
FIG. 13 illustrates an enriched probiotic syrup used as a preserver to form probiotic wet Feed for Animals in accordance with some embodiments.
Figure 14:
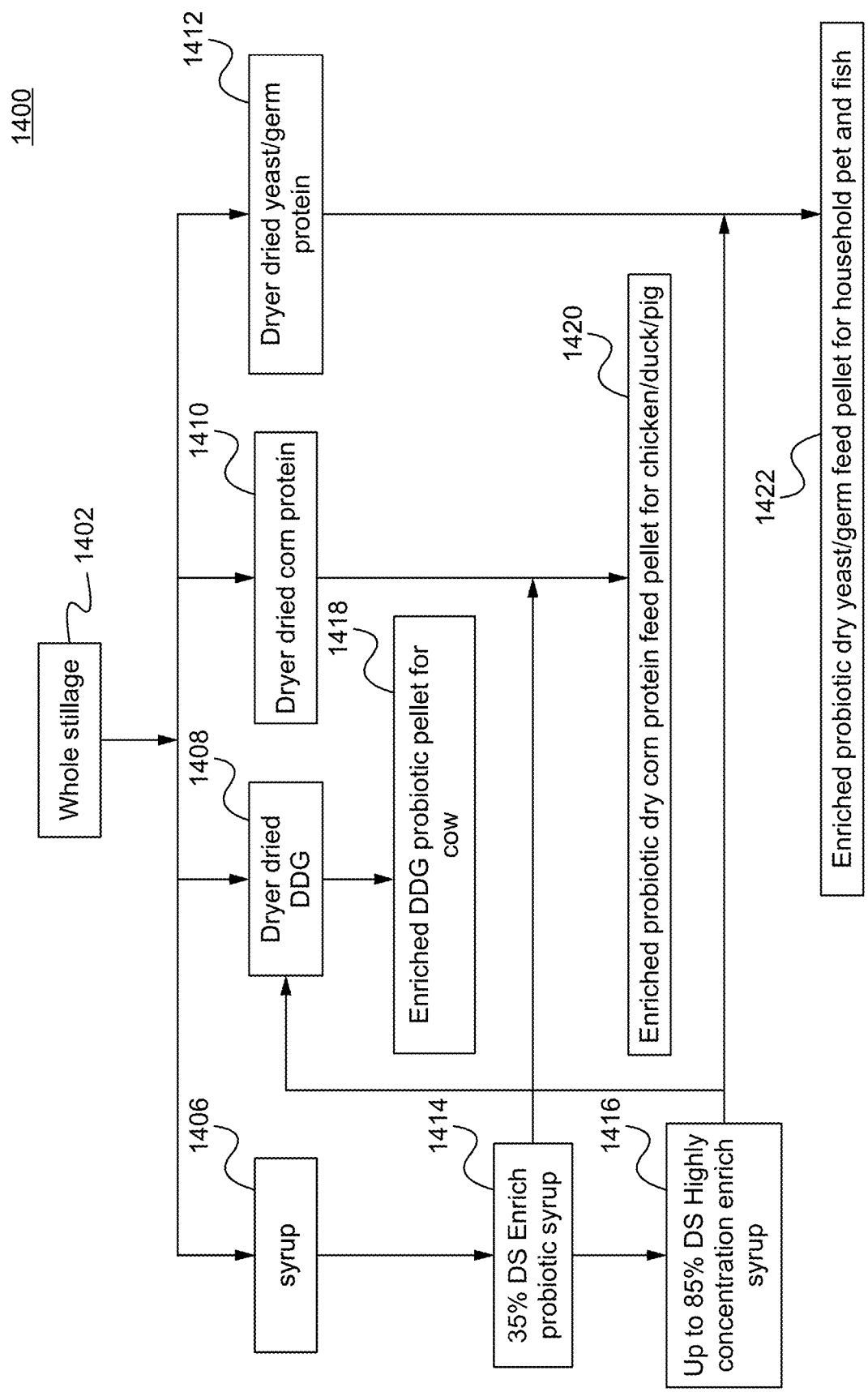
FIG. 14 illustrates an enriched probiotic syrup used as a bonding agent to form an enriched probiotic dry feed pellet for animals in accordance with some embodiments.

FIGS. 13 and 14 illustrate the applications of the syrup produced.

FIG. 13 illustrates a system 1300 using an enriched syrup as a preserver to form probiotic wet feed for animals.

As shown in FIG. 13, the enriched syrup can be used as an enriched probiotic wet feed system. Data shows mixing 85% DS syrup 1302 with 25% DS wet cake 1304 from a protein decanter in an one to one (1:1) ratio to form 55% DS wet feed for baby pig can keep at 40 C room temperature for four months without spoil. The ratio mentioned above are listed as examples. Any other ratios can be used to mix the 85% DS enriched syrup or 35% DS enriched syrup with any other components from the processes discloses herein. For example: mixing 85% DS syrup 1302 with 25% DS wet cake 1304 from a protein decanter in a ratio of 1:2, 1:5, 1:10, 10:1, 4:1, and 0.5:1.

As illustrated in the FIG. 13, the whole stillage 1308 can be used to produce syrup 1310, a DDG wet cake 1304, a corn protein wet cake 1316, and a yeast/germ protein wet cake 1322.

In some embodiments, the syrup 1310 goes through a secondary fermentation with added probiotic culture to produce an enriched probiotic syrup 1312 having 35% DS, which has active probiotic culture up to $10^9$ CFU unit with 20% (in dry base) lactic acid. This enrich probiotic syrup can be further concentrated to become an 85% DS highly concentrated enriched syrup 1314, whereas the probiotics contained therewithin are up to $10^7$ probiotic CFU unit. So this 85% DS syrup is mainly used as a preserver for wet animal feed system. The combination of 35% enriched syrup with high probiotic CFU unit and 85% enriched syrup with high concentration solid can be used to prevent spoil in animal wet feed system.

In application, the 35% DS enriched probiotic syrup 1312 and 85% DS syrup 1314 can be combined with other substances from the dry milling process to form an enriched probiotic wet feed preserver (preventing spoil). For example, the 35% DS enriched syrup can be mixed with the corn protein wet cake 1316 to make an enriched probiotic wet corn protein feed for chickens and ducks 1318. Similarly, the 85% DS highly concentrated enriched syrup 1314 can be mixed with the DDG wet cake 1304 to make the enriched DDG probiotic wet feed for cow 1318. In some embodiments, the 85% DS highly concentrated enriched syrup 1302 can be mixed with the yeast/germ protein wet cake 1322 to make the enriched probiotic wet yeast/germ feed for household pet and fish 1320.

FIG. 14 illustrates a system 1400 using an enriched probiotic syrup as a bonding agent to form an enriched probiotic dry feed pellet for animal.

As shown in FIG. 14, both (35% DS and 85% DS) enriched syrup can be used as a bonding agent to make animal feed pellet/tub with an enriched syrup added to this pellet/tub. This pellet/tub has high lactic acid content and high probiotic unit, which can be used as part of feed supplements.

As illustrated in the FIG. 14, the whole stillage 1402 can be used to produce syrup 1406, a dryer dried DDG 1408, a dryer dried corn protein 1410, and a dryer dried yeast/germ protein 1412.

In some embodiments, the syrup 1406 can be concentrated to become a 35% DS enriched probiotic syrup 1414, which can be further concentrated to become an 85% DS highly concentrated enriched syrup 1416.

In application, the 35% DS enriched probiotic syrup 1414 can be mixed with the dryer dried corn protein 1410 to make an enriched probiotic dried protein feed pellet for chickens and ducks 1420. Similarly, the 85% DS highly concentrated enriched syrup 1416 can be mixed with the dryer dried DDG 1408 to make the enriched DDG probiotic pellet for cow and pigs 1418. In some embodiments, the 85% DS highly concentrated enriched syrup 1416 can be mixed with the dryer dried yeast/germ protein 1412 to make the enriched probiotic dry yeast/germ feed pellet for household pet and fish 1422.

The enriched syrup as described in the FIGS. 13 and 14 can be concentrated to has a dry solid percentage from 35% to 85%. A predetermined percentage (any percentage from 35% to 85% DS; such as 35%, 40%, 43%, 60%, 78%, and 85%) of the concentrated enriched syrup can be used to be mixed with other components from the alcohol production process described herein for producing animal feeds or for pelleting, including the DDG wet cake 1304, the corn protein wet cake 1316, and the yeast/germ protein wet cake 1322 of FIG. 13 and the dryer dried DDG 1408, the dryer dried corn protein 1410, and the dryer dried yeast/germ protein 1412 of FIG. 14.

Figure 15:
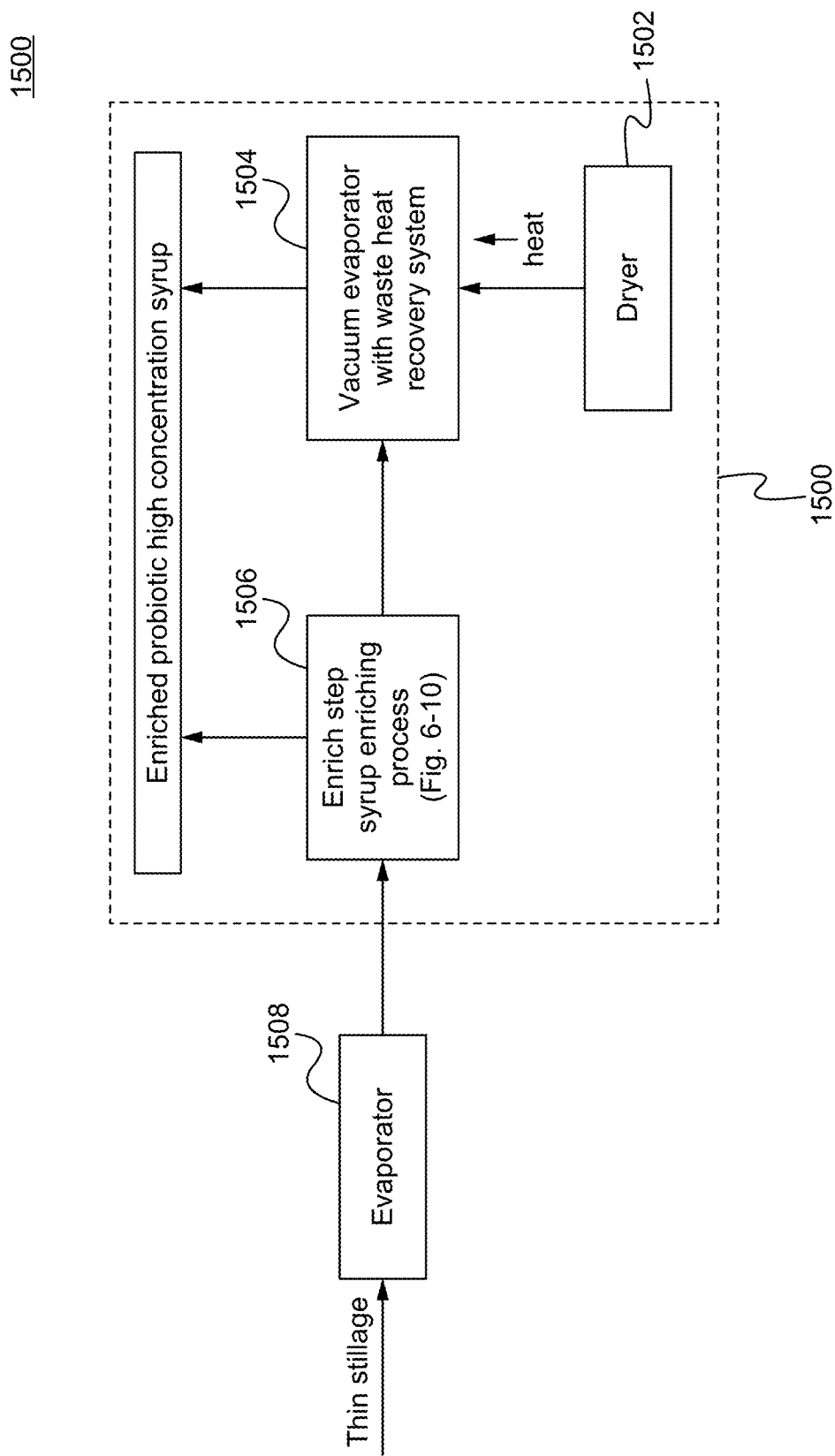
FIG. 15 illustrates a process of producing a high concentration enriched probiotic syrup in accordance with some embodiments.

FIG. 15 illustrates a waste heat recovery system 1500 for evaporating and concentrating a syrup in accordance with some embodiments.

As shown in FIG. 15, a waste heat recovery system 1500 can be added to recover waste heat from a dryer 1502 to evaporate and concentrate the syrup at a vacuum evaporator 1504 from 35% to 85% DS without using other heat sources. The syrup mentioned above can come from a syrup enriching process 1506, which can be the syrup enriching step 59 of FIG. 6.

The above described improved stages, steps, or processes can be used with or added to a typical dry milling plant as whole or in part as needed to produce high quality and valuable byproducts.

Figure 3:
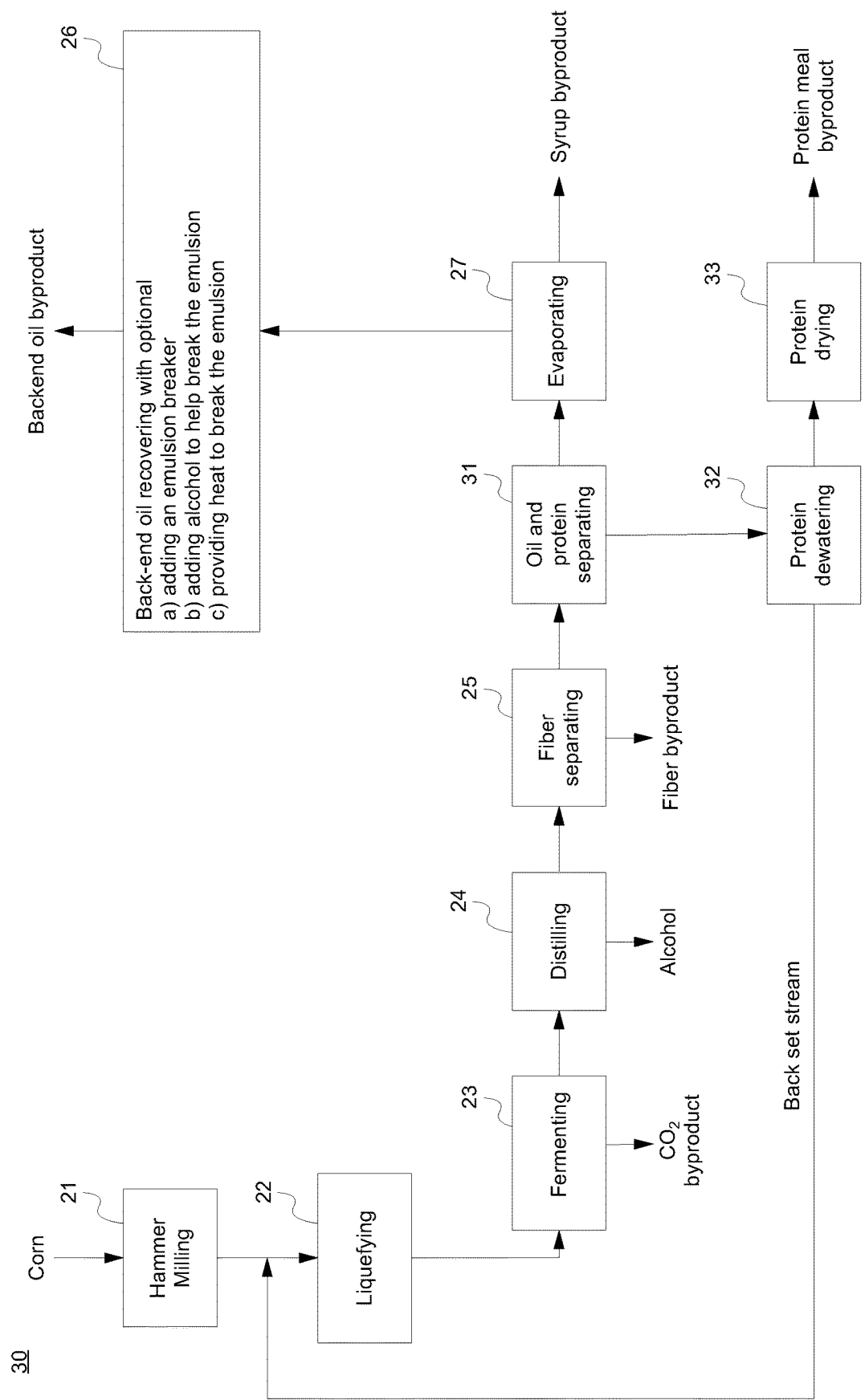
FIG. 3 illustrates a typical dry milling process and system for producing ethanol, which recovers oil and protein using a back end process.

More detailed disclosure is provided in the following:

There are about 3 lb./Bu of gluten protein and 1 lb./Bu of germ protein inside the corn kernel. There are also about 0.4 lb./Bu of yeast protein produced from fermentation. Thus, the total amount of protein is about 4.5 lb./Bu of total protein inside the whole stillage. A protein recovering process (similar to the U.S. Pat. No. 8,778,433, which is incorporated by reference in its entirety for all purposes) is developed with adding an oil/protein separation step 31, a protein dewatering step 32 and a protein drying step 32 to produce protein meal with 50% protein purity. As shown in the process 30 of FIG. 3, the rest of the process is the same or substantially similar to a typical dry mill process. The protein yield using process 30 is only about 3.0 lb./Bu of protein meal with a 50% protein content, so only 33% of protein inside the whole stillage is recovered. There are about 1.9 lb./Bu oil in the corn kennel, with current back end oil recovery system give about average of 0.8 lb./Bu yield, which only recovers about 43% of oil.

Figure 4:
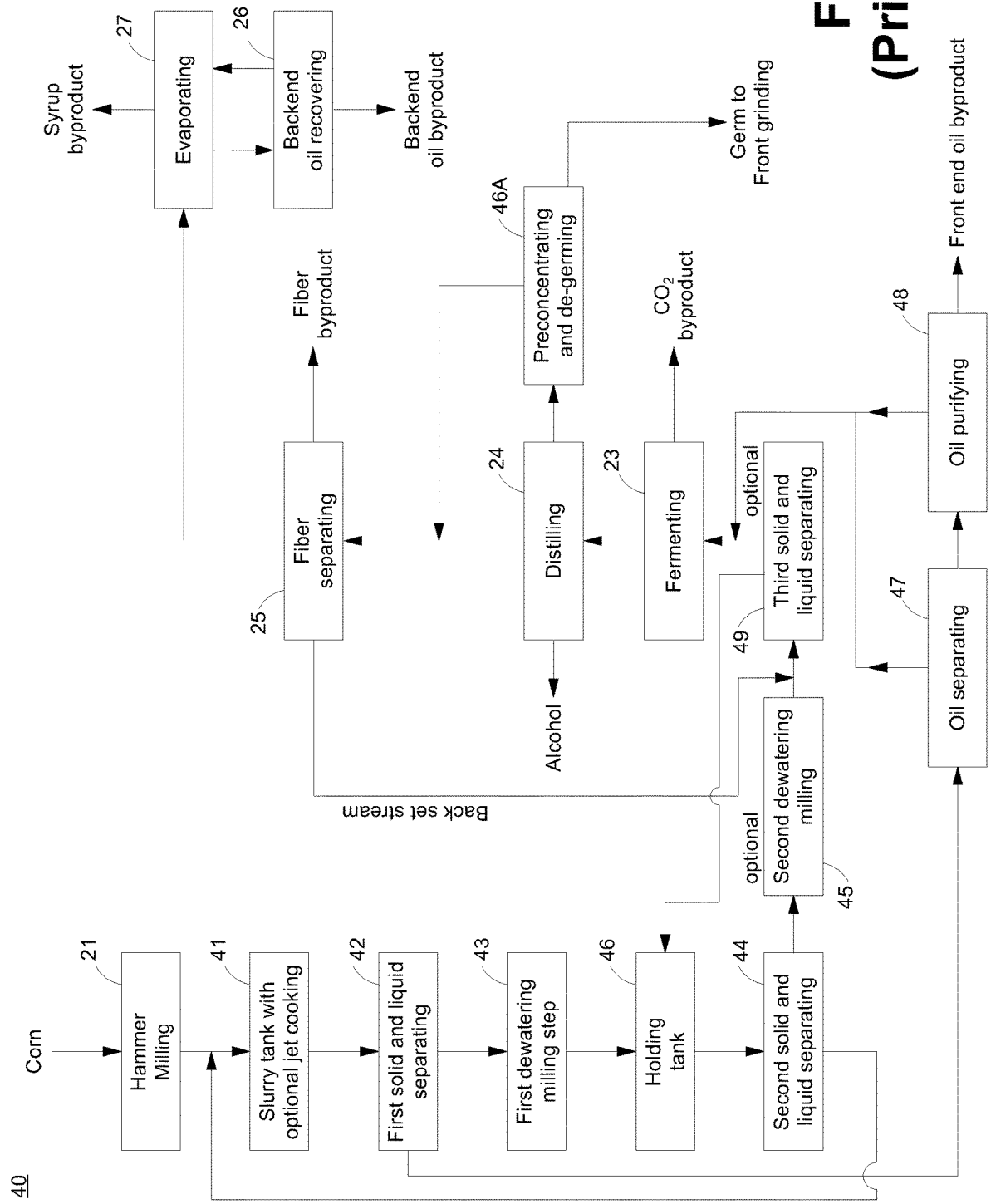
FIG. 4 illustrates a typical dry milling process using a front grinding and a front oil recovering process to increase the yields of alcohol and oil.

With a front-end milling process (e.g., FIG. 4), protein yield increases to 3.5 lb./Bu and the oil yield increases to around 0.9 lb./Bu. The backend milling (FIG. 5) further increases the alcohol, oil, and protein yield by breaking down the germ and grit in the DDG and separating/recovering oil and protein from fiber (fiber are bonded with protein and oil) inside the DDGS. At the same time fiber purity is increased by separating/recovering the protein and oil to produce more valuable white fiber instead of DDG.

Figure 2:
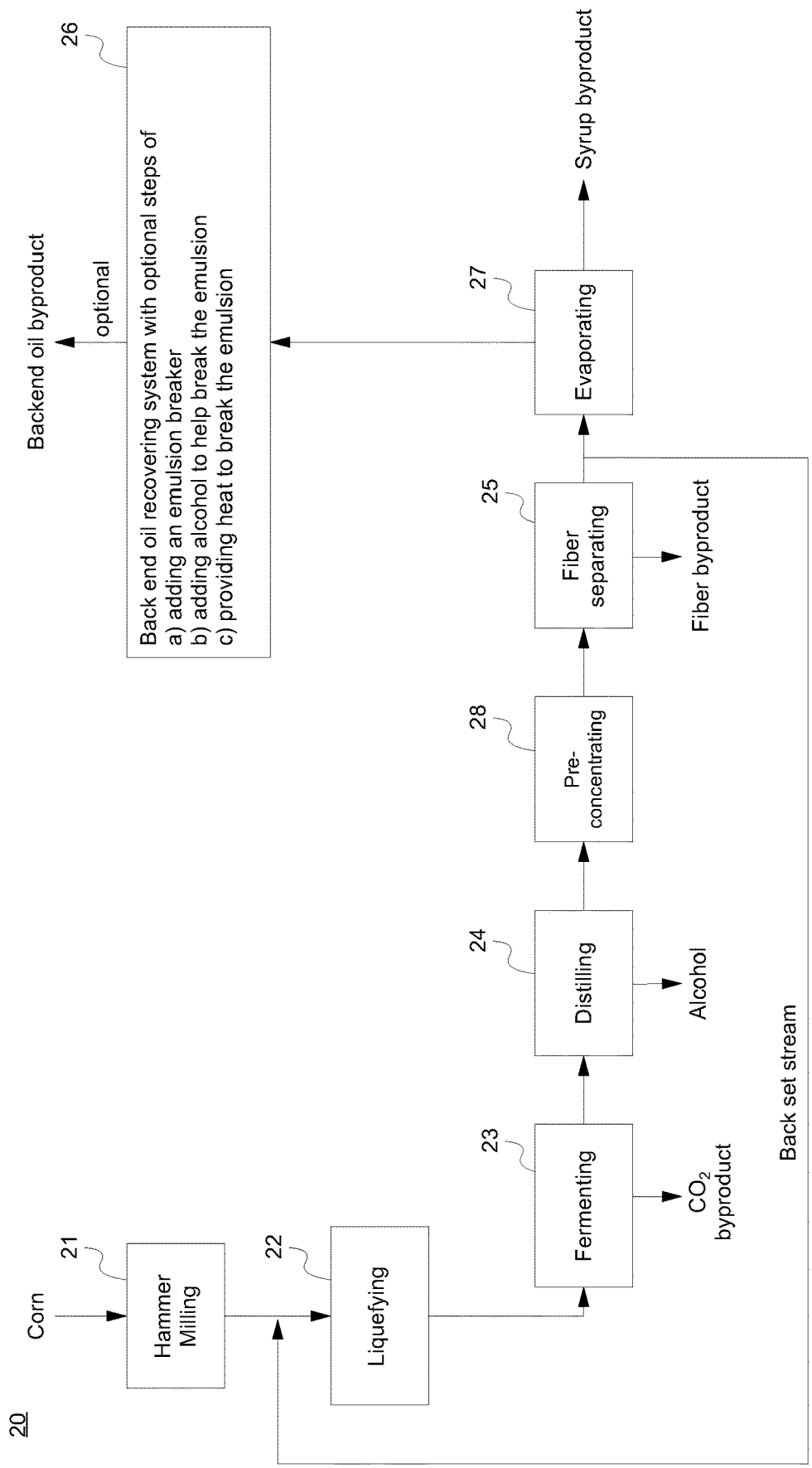
FIG. 2 illustrates a typical dry milling process and system for producing ethanol, which recovers oil using a backend process.

There are more than half of the germs inside the corn still in a germ form found in the whole stillage in the typical dry milling process. The oil inside the germ is protected by the protein cell wall and cannot be separated and recovered by oil recovering system in the typical dry milling with a backend oil recovering system as described in the process 20 of FIG. 2.

Figure 5:
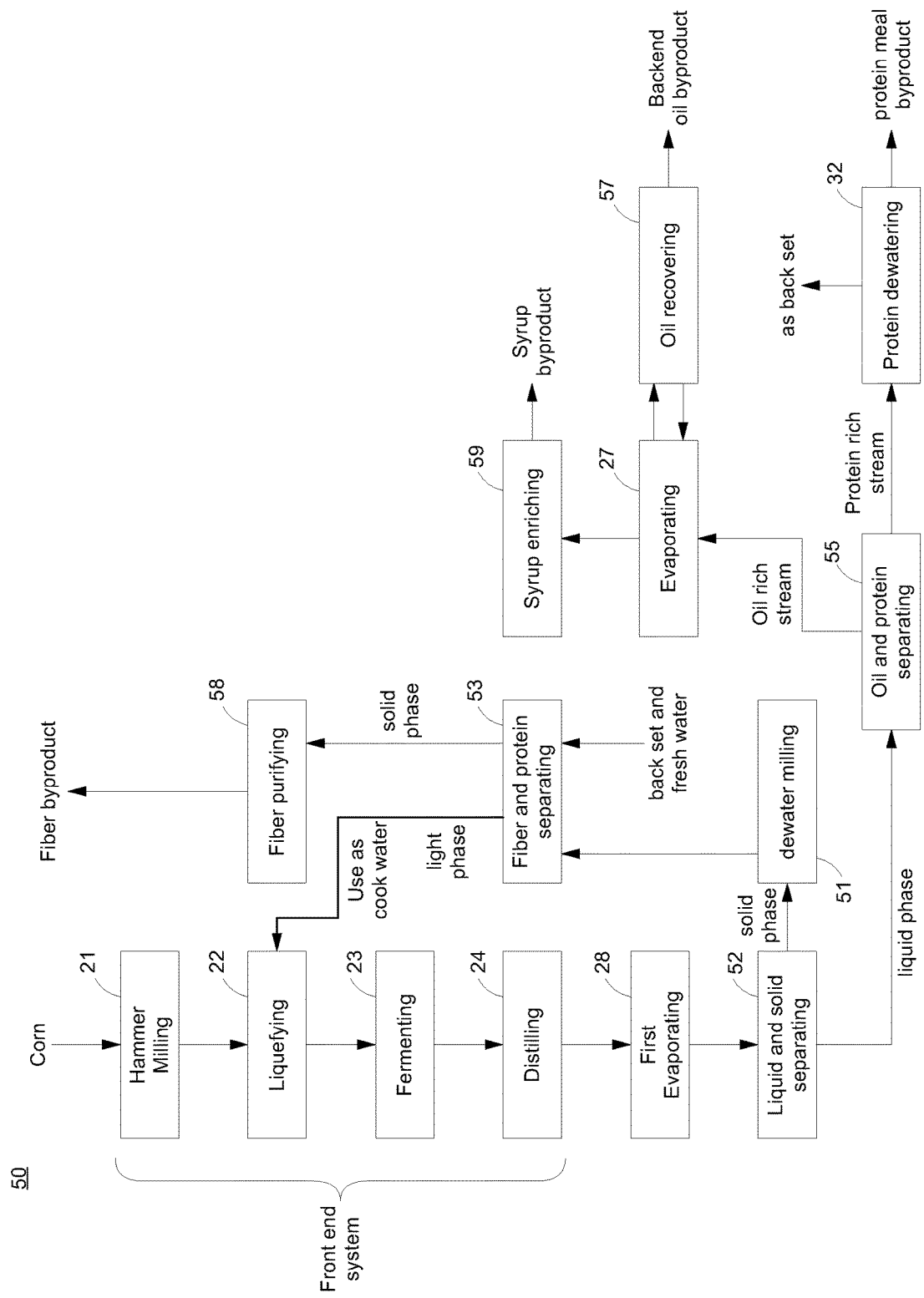
FIG. 5 illustrates a typical system for and method of separating high value byproducts from grains, wherein the grains are used for alcohol production with a back end selective milling process to increase oil and alcohol and protein yield.

The improved back end milling process is described in the FIG. 5. The process 50 includes the liquid and solid separating step 52, dewater milling step 51, germ and fiber separating step 53, and the fiber purifying step to recover the germs. The dewater milling step 51 mills the germs and breaks up the protein cell wall to release oil and produce white fiber.

In the process 50, the corn is sent to a hammer milling step 21, a liquefying step 22, a fermenting step 23, and a distilling step 24, which is like a typical dry milling process. The bottom layer of the distillation (e.g., the whole stillage) at the distilling step 24, which contains fiber, germ particles, corn proteins, yeast, and byproducts from fermenter and ash from corn. The whole stillage with 12% to 14% of DS can be sent to the first evaporator (a preconcentrate step 28) to be concentrated to contain 15% to 25% of DS. The whole stillage or concentrated whole stillage is sent to a liquid and solid separating step 52 to separate the solid (mainly fiber, germ and grit) from liquid (mainly protein, fine germs, starch particles, oil, fine fiber, and soluble solid etc.). The solid phase is sent to a dewater milling step 51 to break the germ and grit particles, so that oil and starch are released. Next after the dewater milling step 51, the grinded solid sent to fiber/protein separation step 53. In this step, the back set stream and fresh cook water are used as washing water to wash the broken germ and grit off fiber. The light phase from the germ and fiber separating step 53 contains mainly germ particles and liquid, wherein the filtrate is sent back to the front end (e.g., the liquefying step 22) as part of cook water. The retained solid from the germ and fiber separating step 53 continues to go through a fiber purifying step 58 to produce white fiber for a secondary alcohol production or water-resistant pulp.

The liquid phase from the solid and liquid separating step 52 is sent to an oil and protein separation step 55, and the resultant is separated into two streams including an oil rich stream and a protein rich stream. The protein rich stream is sent to a protein dewatering step 32 to produce protein cake. The oil rich stream is sent to an evaporating step 27 to be concentrated to contain 30 to 40% of DS. The concentrated syrup is sent to an oil recovering oil step 57 to recover oil as a light phase. The de-oiled syrup in the heavy phase is sent to a syrup enriching step 59 to convert sugar to lactic acid by adding lactic acid culture to produce up to 20% lactic acid (in DB) with $10^9$ CFU probiotic unit.

A two-section paddle screen described in U.S. Pat. No. 9,718,006 with screen openings in the range of 100 to 300 microns is used at a liquid and solid separating step 52. Other types of screen separating devices, such as pressure screen, conical screen and vibration screen, also can be used. The screen opening determines the quality and quantity of protein that is produced. Small screen openings provide a higher purity protein (up to 55%) but lower protein yield (down to 2 lb./Bu). In contrast, large screen openings provide a lower purity protein (down to 40%) and a high protein meal yield (up to 6 lb./Bu). The high-speed disc mills normally are used at the dewater milling step 51. Nonetheless, any other types of particle size reducing device, such as roller mills Supraton or pin mill are used in some embodiments. The paddle screen with a high rate washing design is used at the fiber and protein separating step 53, but other types of solid washing devices, such as conical screen are used in some embodiments. The sizes of the screen openings are in the range of 300 to 500 microns, which determine the quality and quantity of fiber purity and yield. For example, in the case of using 300-micron screen openings, the fiber yield is around 5 lb./Bu and 15% of protein. Using 2000-micron screen openings, the fiber yield is around 2 lb./Bu and 10% of protein. The nozzle centrifuges or disc decanter centrifuge are normally used in the oil and protein separating step 55. Desludger centrifuge and three phase decanters are normally used in the oil recovering step 57.

The above described processes recover oil in the back end (after a fermenting step), which produces oil not in their best quality (e.g., dark color and around 13% of FFA). The process 40 in FIG. 4 recovers oil in the front end (e.g., before a fermenting step), which give better oil quality (light color and around 7% FFA). But the front-end oil recovering system only has an oil yield of 0.5 lb./Bu at best.

Figure 6:
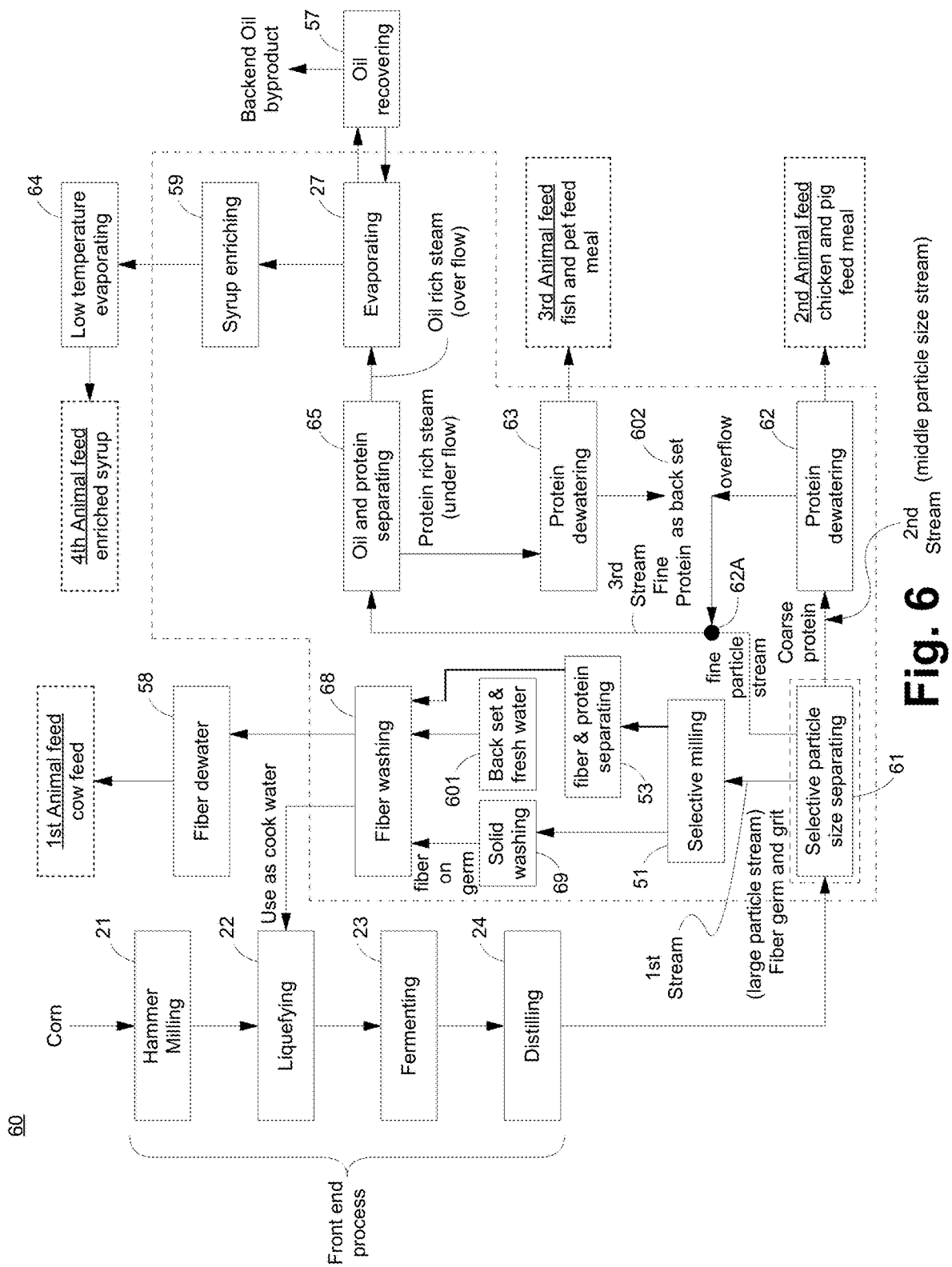
FIG. 6 illustrates a system for and method of producing four types of animal feeds in accordance with some embodiments.

FIG. 6 illustrates an improved high yield backend oil recovering system 60 in accordance with some embodiments.

The process 60 includes a backend oil recovering system providing a yield of oil as high as 1.4 lb./Bu. The embodiments of the present disclosure release more than half of oil that is still bound inside of the germ particles during the liquefying step 22. Using system 60, more oil is released out of the germs during the fermenting step 23 and distillation step 24, because alcohol existing in the fermenter of the fermenting step 23 acts as a solvent extracting the oil from the germ particles. Further, a high temperature used in the distilling step 24 also "cooks" the germs to release the oil that is bound. The above described system 60 produces oil that is 1.8 times of an oil yield than an oil yield using a typical front-end oil recovering process. Accordingly, the methods and system of the present disclosure generate unforeseen and unpredictable results that produce extra oil in an unexpected high yield.

Based on the functioning principle disclosed above, the present disclosure provides methods and systems to increase an oil yield by releasing more bound/unreleased oil that are released, unbound, and/or freed-up in the fermenting step 23 and distilling step 24.

In some embodiments, the methods and system disclosed herein includes the following processes/steps:

a) sending oily stream from a backend step/process to a step of the front-end process and recovering oil by using a front end oil recovering system (e.g., sending an oily stream/portion from any steps (e.g., a fiber washing step 68) after the fermenting step 23 and recovering oil at liquefying step 22);

b) recovering the germs at a step in the back end process, sending back the germs to a step in the front end, grinding germs (e.g., germs sent back to the front end) one more time to release oil, and recovering oil at a step in the front end oil recovering system; and c) adding a back end dewater milling step 51 to release oil from germs, then sending back the resultant to the front end containing an oil and protein emulsion and recovering oil by using a step at the front oil recovering system.

Generally, the germ particles in the front-end oil recovering system do not fully absorb water and are much harder and tougher to break up by using a grinding mill.

In contrast, the present disclosure provides improved processes and systems. These germ particles fully absorb water and become much softer to be more easily broken up in the grinding mill after the fermenting step 23 and the distilling step 24, wherein the distilling step cooks the germs at the bottom of the distiller. Further, a fiber and protein separating step 53 and/or a fiber washing step 68 is used to wash off the attached particles of protein, oil, and starch from fiber, wherein the solution or liquid is sent back to the front end process as cook water. The above disclosed process provides a method of and system to recover more oil and produce more alcohol in a second round.

The backend milling process increases alcohol yield up to 3%, which is achieved by decreasing the percentage of starch in the DDGS down to less than 2%. The backend milling technology also increases oil yield up to 1.4 lb./Bu, which is achieved by decreasing the percentage of oil from 10% to 4% in the DDGS.

There are more advantageous features of using back end milling processes, including producing pure fibers (down to 10% of protein and 3% of oil). The protein yield also increases from 3.5 lb./Bu up to 6 lb./Bu, but the protein purity can drop from 50% to less than 45%. In some embodiments, only one protein meal is produced in this simple back end system (e.g., FIG. 5). High value spent yeast and germ protein are mixed with zein protein and fine fiber in this protein meal. With the market demand for high quality protein meal for making pet food and fish food, a process of and system for separating the above mentioned protein mixture into two types of protein: one is with spent yeast and germ protein with 45% of protein content for making feed for household pet and fish; and the other one is with Zein protein and fine fiber having around 45% of protein for making a feed for chicken and pig diet.

More advantageous features in some embodiments are disclosed. For example, four types of animal feeds are made from the whole stillage in accordance with some embodiments. The present disclosure provides one of the most efficient and economical way for using a dry milling plant to make animal feeds. The whole stillage has 7 to 9 lb./Bu of solid particles, which have a size greater than 500 microns. The solid particles contain mainly pericarp and tip cap with some amount of germ and grit particles. The solid particles also contain 25% to 27% of protein and 7% to 9% of oil.

Still referring to FIG. 6, after performing the backend milling step 51, solids have a yield between 10 to 20% of protein, and 3% to 5% of oil. The yield of the protein in the whole stillage with the backend milling system increases from 4 lb./Bu to 6 lb./Bu, which contains Zein protein, fine fiber, germ protein and spent yeast. The spent yeast and germs are more valuable than Zein protein and fine fiber. The spent yeast and germ protein can be used for household pet and fish diets/feeds, whereas, Zein protein and fine fiber fit better to make feeds for chickens and pigs. Separating different ingredients helps to meet the market demands.

Referring to FIG. 6, more detailed embodiments are disclosed. In general, the liquid is called thin stillage after solid fiber and protein removal. The thin stillage contains all the minerals from corns and nutrients (e.g., vitamins etc.) from dead yeast cells, which are valuable ingredients suitable for making a baby animal feed.

In some embodiments, a high temperature drying is intentionally avoided to prevent a high heat destroying the temperature sensitive ingredients. In some embodiments, a high-speed nozzle centrifuge or disc decanter is used to produce extra clean thin stillage (containing less than 2% by volume of solids by spin test) and can be evaporated up to have 85% of DS.

As described above, this high solid content syrup bypasses (e.g., not going through or avoid using) a dryer and directly adding the high solid content syrup to dry solids after a drying step, and form a "spoilless" (can keep at room temperature for long time) under a "wet" condition (more than 10% moisture), the high nutrient animal feed products with the enriched syrup bypass high temperature dryer to avoid the high value nutrient (call "unknown growth factor") inside enrich syrup breakdown by high temperature in dryer. The thin stillage is normally evaporated to become a syrup having 30% to 40% of DS. The syrup is then sent to a de-oil step to recover valuable oil, which can be used for making a bio diesel. Then it goes through a syrup enriching step 59 to convert residual sugar to lactic acid by adding lactic acid, which produces probiotic cultures. Further, a secondary fermenting step produces up to 20% of (in DB) lactic acid and $10^9$ CFU probiotic unit. This enriched syrup can be sent to a low temperature vacuum evaporator to be concentrated to contain 85% of DS. Next, the enriched syrup can be added to dry feed products coming from a dryer to form final feed products with enriched syrup that avoided a high temperature dryer.

Still referring to the process 60, of FIG. 6, the whole stillage goes through a selective particle size separating step 61 after a hammer milling step 21, a liquefying step 22, a fermenting step 23, and a distilling step 24.

After the Step 61, the whole stillage is separated into three different solid particle sizes a) larger than 300 micron particle sizes (e.g., mainly containing the pericap, tip cap, germ, and grit; b) particles in the range of 50 to 300 micron, which mainly contains fine fiber and Zein protein; c) particles have sizes smaller than 50 micron, which mainly contains spent yeast, germs, and protein. The selection of the screen size can depend on the used upstream processes (such as the hammermill screen size opening), product purity needed, and quality to meet the market needs. A paddle screen with three sections of screens, which are also disclosed in the present disclosure, are able to be used to separate those three streams. Any other types of screening device can be used. In some embodiments, three screening devices/three screens are used in series to achieve this three-stream separation based on different particle sizes:

A) The large particle size stream (mainly pericarp, tip cap, germs, and grits): The whole stillage is sent to the selective particle size separating step 61. The resultant from the selective particle size separating step 61 is sent to the selective milling step 51 for milling and grinding to break down the particles of germs and grits. At a fiber washing step 68, the broken germ and grit particles are washed off from fiber, which is performed by using a backset liquid and fresh cook water 601 as a washing liquid. The washing liquid at the fiber washing step 68 carries all broken germ and grit particles back to liquefying step 22 to further recover more oil and protein. The washed fiber from the fiber washing step 68 now contains 10% to 15% of protein and 3% of oil and is ideal for making a feed for cows. The fibers can be digested by cows and used as an energy source.

B) Middle particle size stream contains mainly fine fiber and zein protein. The middle size particle stream from the selective particle size separating 61 is sent to a protein dewatering step 62, which produces protein cake. The protein case is used as chicken and pig feed. At the dewatering step 62, a decanter centrifuge is normally used. In some other embodiments, vacuum drum filter are used. The overflow from the decanter at the dewatering step 62 contains fine protein (mainly spent yeast and germ protein) is mixed with fine particle stream from the selective particle size separating 61 to be sent to the oil and protein separating step 65.

C) Fine particle size stream contains mainly spent yeast, germ protein, and oil and protein emulsion. The fine particle size stream is sent to an oil and protein separating step 65. A high-speed nozzle centrifuge or a new disc decanter centrifuge is generally used at this step. The oil and protein emulsion are broken up using a high G force centrifuge. The protein rich stream is sent to a protein dewatering step 63 to produce a high quality protein cake for household pet and fish diet. Decanter centrifuge is generally used at this step. The overflow from the protein dewatering step 63 is used as a backset stream 602.

At the oil and protein separating step 65, the oil rich stream is sent to an evaporator at an evaporating step 27 to concentrate the solution to contain 30% to 40% of DS (e.g., 35% DS syrup). The resultant is sent to an oil recovering step 57 to recover corn oil, wherein the corn oil is used as a bio-diesel feed stock. The de-oiled syrup is sent to a syrup enriching step 59 to convert residual sugar in syrup to lactic acid, which is done by adding an amount of lactic acid producing probiotic culture, wherein a secondary fermentation occurs. After the syrup enriching step 59, the enriched syrup is further concentrated up to contain 85% of syrup by using a low temperature vacuum evaporator at a low temperature evaporating step 64. A waste heat recovery system (not shown) can be used to save energy by using waste heat recovered from a dryer and used as heat source for low temperature vacuum evaporator. This 85% enriched syrup contains 20% of lactic acid (in dry base) and $10^7$ CFU probiotic, which can be used as part of baby animal milk substitute or part of animal drinking water. It also can be used as a bond agent on all feed pellet processes. Further, the 85% enriched syrup also bypasses/avoids dryer, wherein the 85% enriched syrup can be added to any dried feed product from the dryer to form a final feed product.

At the selective particle size separating step 61, methods and equipment specification that are used to split the whole stillage into three or more streams can be determined by the factors of predetermined particle sizes, shape of particles, density of particles, or a combination thereof. For example, a paddle screen with three section screen sizes in one device (e.g., three section of screen openings with 50, 300, and 300/500 microns) can be used. The solids that go through the first section screen with 50-micron openings are solids smaller than 50 microns including spent yeast and germ protein. The solids that go through the second section of the screen with screen opening of 300 microns are particles with sizes between 50 to 300 microns, including fine fiber and zein protein. All the solids larger than 300 microns are dewatered in the last section screen with 300-micron openings before going to a dewater milling step 51.

The basic mechanical function of three section screen is similar to a two section paddle screen as described in very detail in U.S. Pat. No. 9,718,006. This new three section paddle screen design has an additional one or more section screen on exiting two section paddle screens, which is described in the U.S. Pat. No. 9,718,006, which forms this new three section screen paddle design. So, this machine can separate three type solid in one device instead of used two screen devices in series to perform the task.

Three section paddle screens are further improved as a part of this disclosure. There are three different type of solids in the whole stillage. The solids are different in their sizes and shapes. So, a better sharp separation cannot be obtained only by using the differences in the screen size openings in this three-section screen.

In some embodiments, the type of different screen openings (such as round hole openings or slot openings) are used. Whole stillage has three type of solids a) coarse fiber (pericarp and tip cap) with thin plate type solid and some germ and grit solid with same three dimension block type solid, b) Zein protein with fine fiber has a smaller diameter (can be smaller then 50 micron diameter with more than 0.5 mm long fiber type solid), c) spent yeast and fine germ protein with less than 50 microns in size and same three dimension sharp. In order to provide a better sharp separation on those three-type solids, a three-section screen paddle screen (see FIG. 11) is disclosed. This three-section screen will have different screen size openings as well as different types of screen opening design.

Figure 12A:
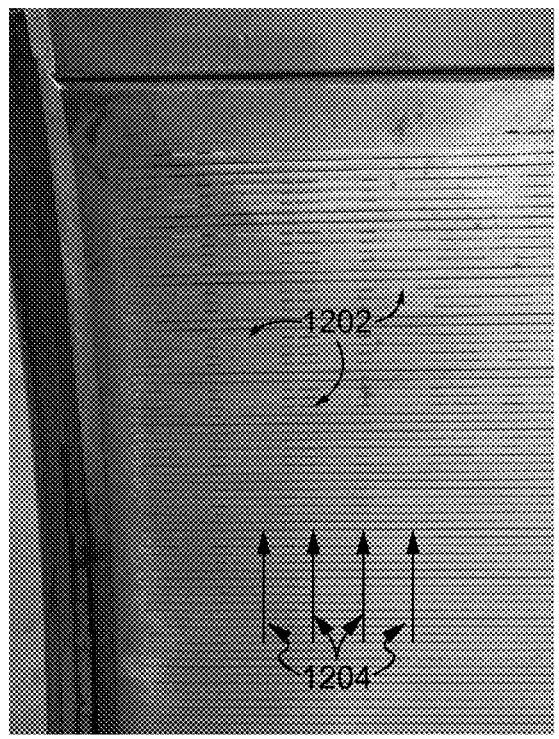
FIG. 12A illustrates a screen design with slot openings vertical (cross) to a liquid flow direction in accordance with some embodiments.
Figure 12B:
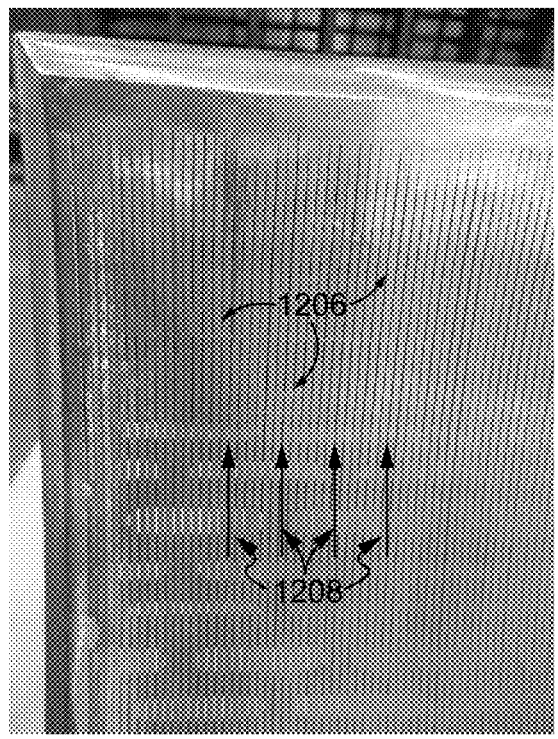
FIG. 12B illustrates a screen design with slot openings parallel to a liquid flow direction in accordance with some embodiments.

FIG. 12A illustrates slot 1202 openings in vertical (e.g., crossing) a liquid flow 1204. FIG. 12B illustrates slot openings parallel to the liquid flow. This three-sectional screen paddle screen generates sharper separation on different size/type of solid in feed.

Figure 11:
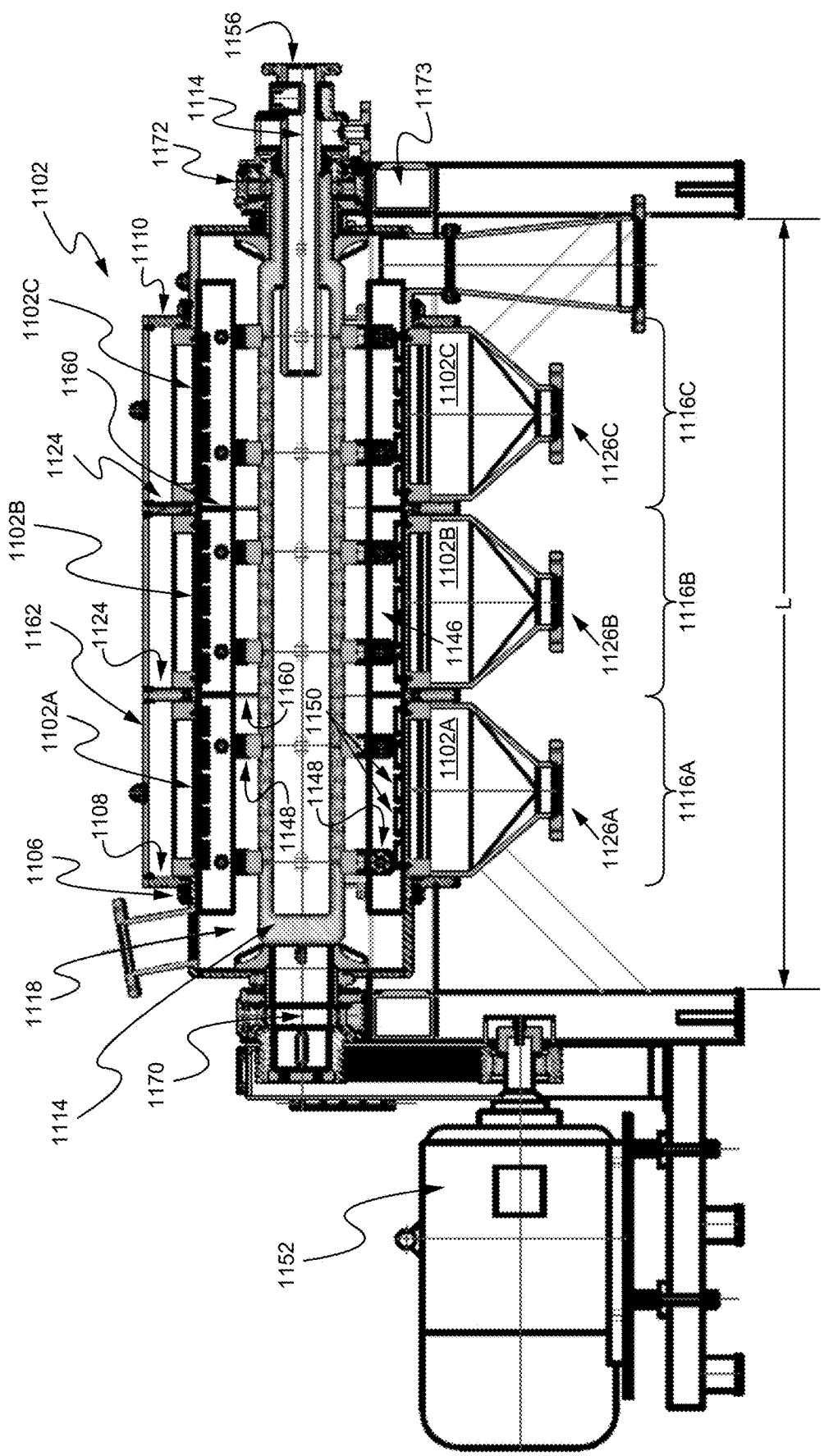
FIG. 11 illustrate a paddle screen with three section screens and a high rate washing capability in accordance with some embodiments.

For example, 50 micron wedge wire screen with slot openings vertical (cross) to the liquid flow is used on the first sectional screen, so the spent yeast and fine germ particle smaller than 50 micron size goes through the first sectional screen and is collected in first filtrate chamber as shown in the FIG. 11. Zein protein and fine fiber with slim (smaller then 50 micron in diameter) long (more than 500 micron in length) will not go through because the slot open is vertical (cross) to liquid flow (more than 500 micron long fiber type solid even with smaller than 50 micron diameter), because more than 500 micron length cannot go though only 50 micron slot open when long fiber length is always same direction as liquid flow.

In the second sectional screen, 75 to 300 microns opening of a wedge wire screen with slot openings parallel to liquid flow is used. The zein protein with fine fiber with more than 500 microns in length can/will go through screen and be collected in a second sectional filtrate chamber even though the Zein protein with fine fiber has more than 500 microns in length because the slot opening is parallel to the liquid flow. Because it is a long fiber type solid, the length always lays in same direction as the liquid flow.

In the third sectional screen, the openings can be round holes or any other slot opening screen with more than 500 microns screen opening to retain any solid larger than 500 micron and dewater to be as dry as possible before feeding into the selective milling step 51.

In some embodiments, three different types of screen openings are used on the whole stillage. The separation testing results of the three types of solids is illustrated using the device in the FIG. 11. Three screens with various size and type of slot openings can be changed and adjusted depending on the intended quality and quantity of the three type solids in the final products. The advantages of this three-sectional paddle screen design disclosed herein will be discussed in more details in the process of 70, 80, and 90 (FIGS. 7, 8, and 9) with various screen devices to perform three solids separation of whole stillage stream.

The three sectional screen design disclosed herein is also a further improvement from the previous two sectional screen design described in the U.S. Pat. No. 9,718,006. The three sectional screen design disclosed herein increases the solid washing capability of the previous two section screen design, which has a limited washing water capacity and less washing dewatering area. A bigger screen ID (e.g., inside diameter of screen), with a larger washing water inlet pipe size and larger washing area can meet a high rate washing capability that is useful in this backend milling process.

Figure 7:
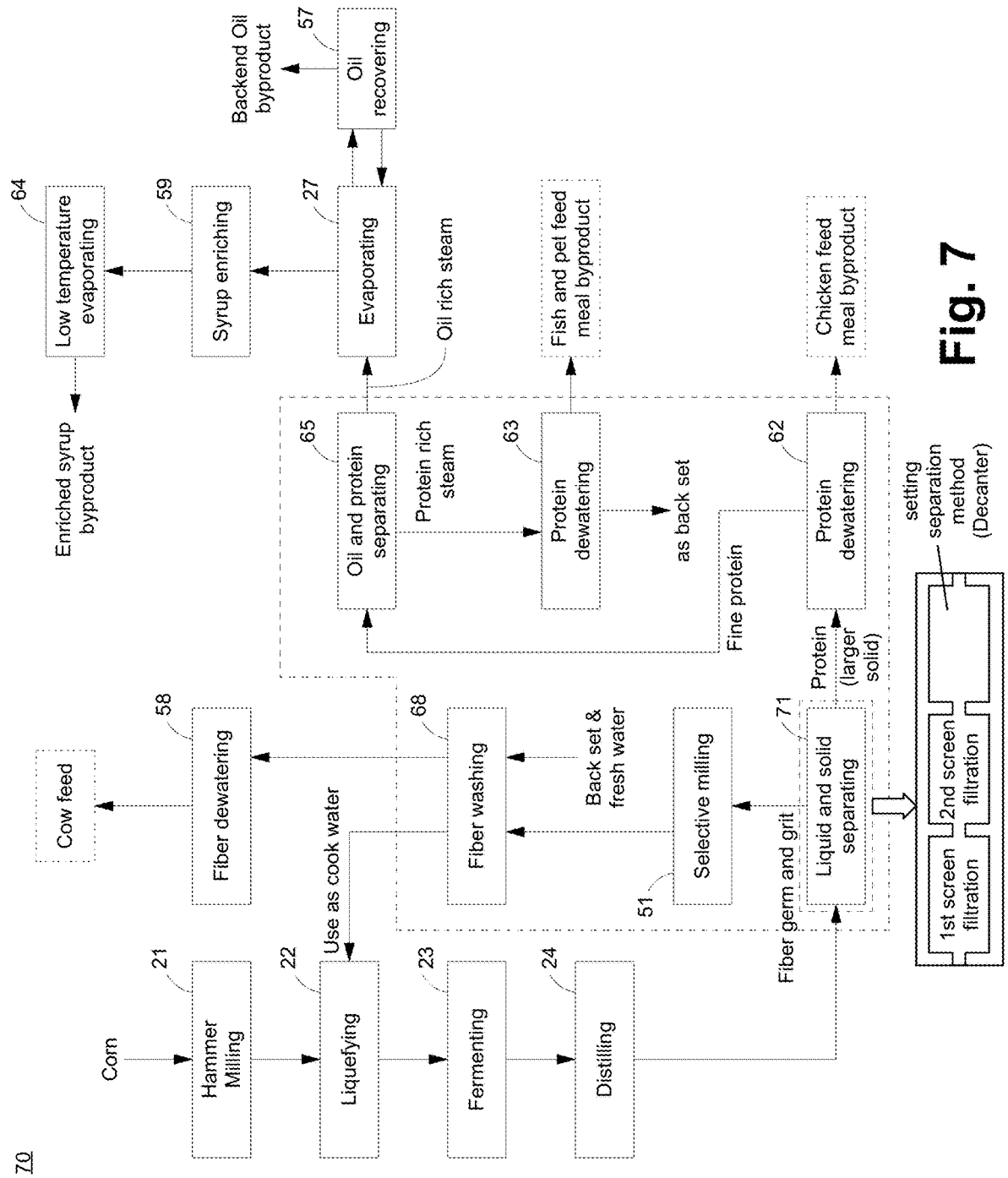
FIG. 7 illustrates a system for and method of producing four types of animal feed for various animals in accordance with some embodiments.

FIG. 7 illustrates a process 70 of making animal feeds in accordance with some embodiments. Same reference number that refers to the same process steps and details that are described in the figures are not repeated. After a hammer milling step 21, a liquefying step 21, a fermenting step 23, and a distilling step 24, a liquid and solid separating step 71 is performed.

At the liquid and solid separation step 71, the whole stillage is sent to a two/three-section screen device, such as using a paddle screen with a first 300-micron screen, and a second 300/500-micron screen. The particles that go through the first section with a 300-micron screen include particles that are smaller than 300 microns, including spent yeast, germ protein, fine fiber, and zein protein. This combined protein stream is sent to another separation device, such as a decanter, so that larger and heavy solids can be removed. The larger solid includes fine fiber and zein protein, which can be used to make a protein cake as chicken and pig feed.

The overflow of the decanter carrying all the lighter and smaller particles, such as spent yeast and germ protein, is separated from the larger and heavy solids described above. Using the process described above, solids are separated by using one or more screen filtration first, then followed by using one or more settling separation methods (e.g., combining using particle size and density as principle of separation.)

Figure 8:
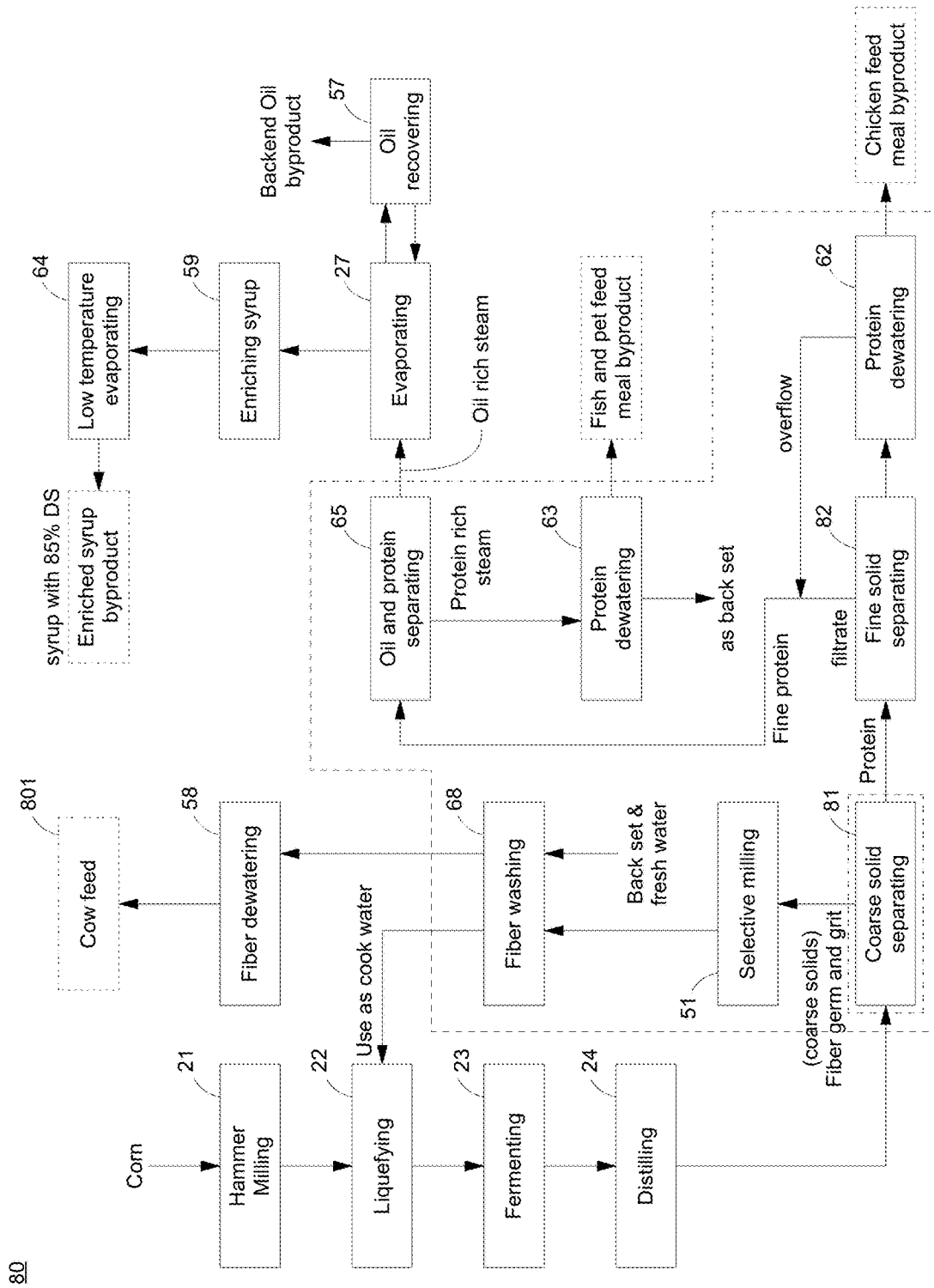
FIG. 8 illustrates a separation system for separating various sizes of particle size in accordance with some embodiments.

FIG. 8 illustrates a process 80 of making animal feeds in accordance with some embodiments. Same reference number that refers to the same process steps and details that are described in the FIG. 7 are incorporated by reference and not to be repeated. After a hammer milling step 21, a liquefying step 21, a fermenting step 23, and a distilling step 24, a coarse solid separating step 81 is performed.

At the coarse solid separating step 81, the whole stillage is separated into coarse solids (fiber, germ, and grit) and proteins (spent yeast, germ protein and corn protein). The paddle screen with two sectional screens are able to be used at this step.

At the coarse solid separating step 81, the coarse solid stream (including the fiber, germ and grit particles) are sent to a selective milling step 51 to break up germs and grits. Next, a fiber washing step 68 is performed to recover protein and oil of a second round. At the fiber washing step 68, the washed fiber has a lower protein content (e.g., less than 15%) and lower oil (e.g., less than 3%), which can be used as a cow feed 801.

At the coarse solid separating step 81, the liquid and all protein particles are sent to a fine solid separation step 82 to separate fine solid (spent yeast and fine germ protein) from middle size solid (corn protein and fine fiber). At the fine solid separation step 82, a pressure screen or other type screen, such as a conic screen can be used. The corn protein and fine fiber at are retained on fine solid separation step 82 are sent to a protein dewater step 62 to produce corn (zein) protein for chicken and pig.

The overflow from protein dewater step 62 containing some fine protein (spent yeast and fine germ protein) are mixed with a filtrate from fine solid separation step 82 to be sent to an oil protein separation step 65. The fine solid separation step 82 in the process 80 provides a much sharper separation between fine protein (spent yeast and fine germ protein) and corn (Zein) protein.

As described above, the liquid and all protein (spent yeast, germ protein, fine fiber, and Zein protein) portion, from coarse solid separation step 81, is sent to a fine solid separating step 82 to separate the two protein streams. The first protein streams contain spent yeast and fine germ protein. The second protein stream contains fine fiber with zein protein. The second protein stream (e.g., containing fine fiber and zein) is sent to a protein dewatering step 62 to produce protein meal, which has a content of 40% to 45% of protein and less than 3% oil, wherein the protein meal is used to make a feed for chicken and pig. The fine protein with oil stream is sent to oil and protein separating step 65. Next, a protein dewatering step 63 is performed to produce high quality protein with spent yeast and germ protein, which can be used as feed for household pet and fish diet.

At the oil and protein separating step 65, the oil stream is sent to an evaporating step 27, an oil recovering step 57, a syrup enriching step 59, and a low temperature evaporating step 64 to produce an enriched syrup having 85% of DS, which is similar to the processes that are described in the processes 60 of FIG. 6 and 70 of FIG. 7.

In some embodiments, at the oil and protein separating step 65, the paddle screen with screen openings between 200 to 500 microns is used. In other embodiments, another type of a screen device, such as a conical screen or a vibrating screen, is used. The screen size openings determine the quality and the quantity of the fiber feed and protein meal that are produced.

For example, using a fine screen produces a higher fiber yield, which also generates a higher protein and oil content in the fiber side/portion. A pressure screen, conical screen, a continuous brush strainer, and any other screening devices can be used in the fine solid separating step 82 in accordance with some embodiments. The screen size that is used determines the quality and the quantity of protein produced. Smaller screen openings provide a high quality of a fine protein, which is used as feed for fish and pet, but with a lower yield.

In some embodiments, the screen is a thin sheet with round holes, slot openings, or a wedge wire screen. In some embodiments, two types of wedge wire screens are used. One is a slot opening cross/against the flow. The other one having openings parallel to the flow. The slot opening that is cross to the flow prevents fine fiber from going through the slot opening. In contrast, the openings parallel to the flow make it easier for fine fiber to go through the slot openings. The wedge wire with slot parallel to the flow is used for protein and fiber separation at the step 81, and the wedge wire slots cross to the flow are used on two types of protein separating on the step 82.

Figure 9:
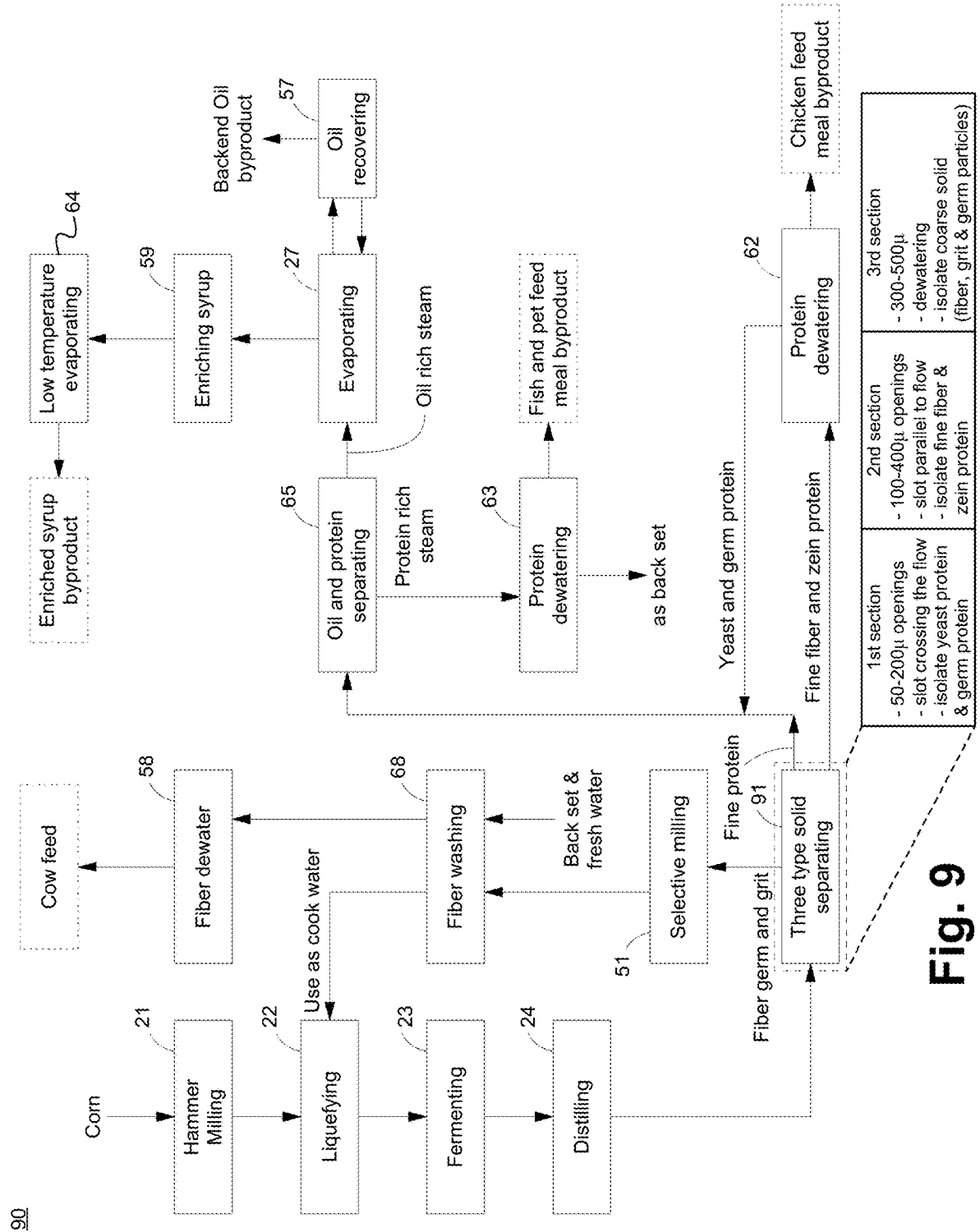
FIG. 9 illustrates another system for and method of particle size separation in accordance with some embodiments.

FIG. 9 illustrates another system for and method of animal feed production in accordance with some embodiments. In a process 90, a three-type solid separating step 91 is used, which combines the functions and/or structures of the coarse solid separating step 81 and the fine separating step 82 in the process 80 of FIG. 8. The three-type solid separating step 91 uses a three-sectional screen paddle screen, which has three sectional screens inside. Each of the sectional screens has different screen size openings and different type of screen designs to obtain the predetermined degrees of solid separations of the whole stillage into three types of animal feed products for three types of animals.

For example, the first sectional screen of the three sectional screen paddle screen has screen openings from 50 to 200 microns, which has round hole screens or wedge wire screens with slots crossing the flow, so the fine solid (mainly yeast protein and germ protein in the whole stillage will go though and be separated out.

The second sectional screen of the three-section screen paddle screen has screen openings 100 to 400 microns with wedge wire with slots parallel to flow, so the fine fiber and Zein protein go though the screen and are separated from the whole stillage.

The third section screen has screen openings of 300 to 500 microns with round hole screens or wedge wire screens to separate the coarse solid (fiber, grit, and germ particles), wherein the third section screen also contains structure/function for dewatering. The fiber, germs, and grits are sent to a selective milling step 51. The above described screen size openings and the type of screens are variable and adjustable depending on the predetermined purity and yields of the three type animal feeds.

In the process 90 of the FIG. 9, all three-types of different solids are separated after the fermenting step 23. However, the coarse solid (fiber portion) can be removed before the fermenting step 23 to improve fermentation efficient, which is further illustrated in FIG. 10.

Figure 10:
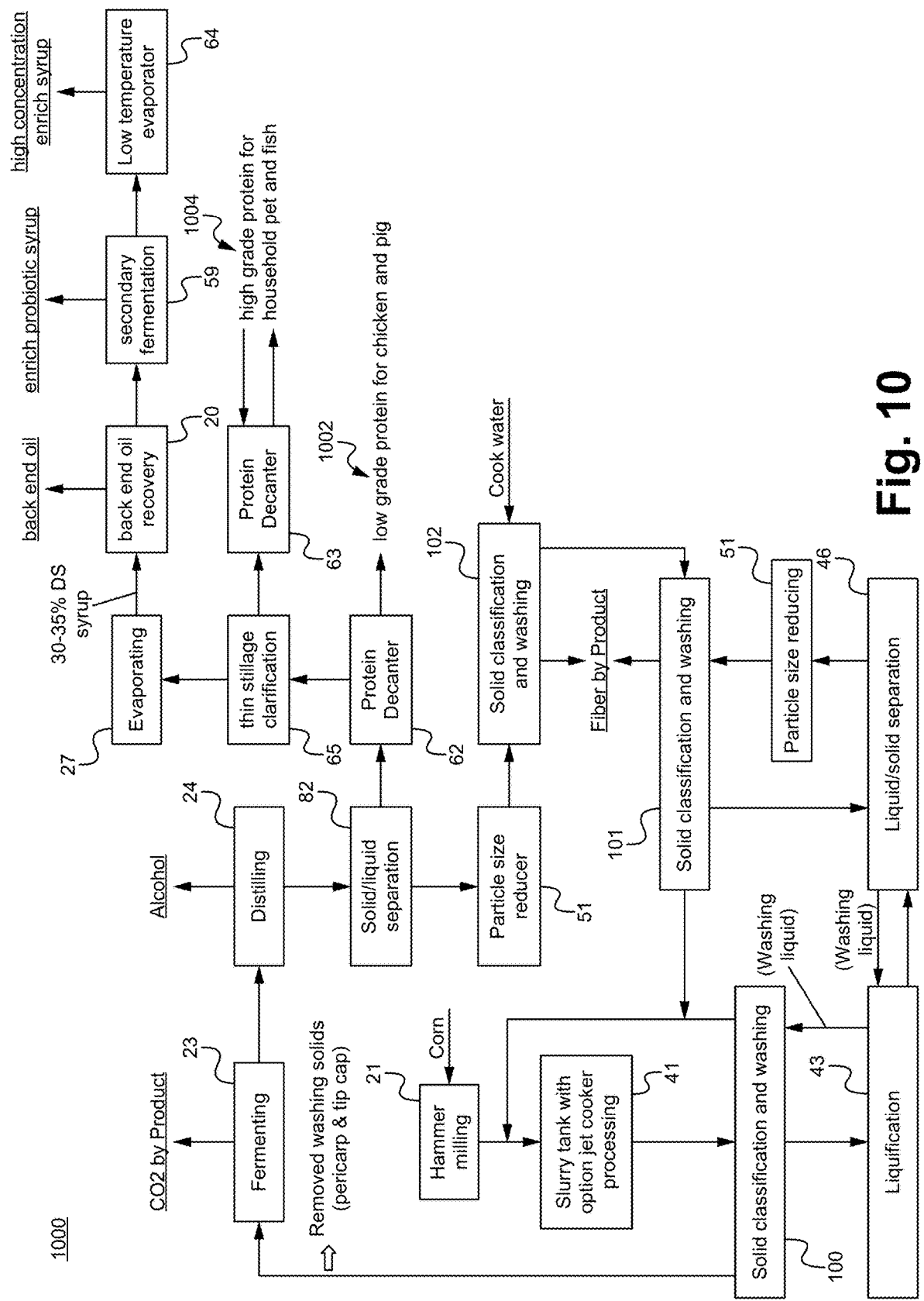
FIG. 10 illustrates another system for and method of particle size separation in accordance with some embodiments.

FIG. 10 illustrates a dry milling alcohol production process 1000, which removes fiber before a fermentation step and produces three animal feed in accordance with some embodiments.

In the FIG. 10, the corn goes through a hammer milling step 21 to form corn flour, which is mixed with a low Brix liquefied starch solution in a slurry tank with an optional jet cooker to liquify the starch to form a high Brix (>20) liquified starch in the slurry tank at a jet cooker processing step 41.

At the jet cooker processing step 41, the slurry with a mixture of solid particle (pericarp, tip cap, grit, and germ) and liquid (mainly liquified starch solution (more than 20 Brix) are sent to a solid classification and washing step 100. At the solid classification and washing step 100, the filtrate from a first sectional screen contains mainly fine solid (like protein, fine germ particle etc.) in a high Brix liquefied starch solution, which is sent to a fermenter at a fermenting step 23.

At the solid classification and washing step 100, the $2^{nd}$ and $3^{rd}$ sectional screens are used to wash the solids (pericarp, tip cap, germ, and grit.) The filtrate (low Brix) from a solid/liquid separation step 46 are used as washing liquid to wash the coarse solid (pericarp, tip cap, grit and germ). At the solid classification and washing step 100, the washing liquid from the $2^{nd}$ and $3^{rd}$ sectional screens are recycled back to slurry tank at the step 41 as cook water.

At the solid classification and washing step 100, the washed solid (pericarp, tip cap, grit, and germ) soak/cook is much lower in Brix and has a much longer time in a liquefaction tank step 43 to become much softer and easier to break up. This soak/cook solid is sent to a solid/liquid separation step 46 to dewater. The filtrate from the solid/liquid separation step 46 is used as washing liquid in the solid classification and washing step 100. At the solid/liquid separation step 46, the dewatered solid are sent to a particle size reduce device step 51 to break up the grit and germ particles.

At the particle size reduce device step 51, the solid is sent to the solid classification and washing step 101.

At the solid/liquid separation step 46, the liquid with broken up grit and germ particles from first sectional screen is sent to the liquification step 43. The washing solids (mainly pericarp and tip cap) can be removed out before the fermenting step 23. The advantage of remove fiber before ferment increases the fermentation capacity as well the efficiency. Nonetheless, the disadvantage is that the fiber contains more germ and grit particle, which can result in lower alcohol, oil and protein yields when compared with the process 90 in the FIG. 9, which does not remove fiber from the whole stillage before the fermentation.

The process 100 of FIG. 10, the whole front end (before fermenting step 23) are designed to have the solid particles (fiber grit and germ) and liquid (cook water) as a counter current to provide a maximum soaking/cooking time in a much lower Brix sugar solution, so that more purer fiber (less grit and germ) is produced in the front end.

For solid classification and washing steps 100, 101, and 102, any existing screen devices, such as vibration screen, conic screen, screen bowl decanter and pressure screen are used in some embodiments. Further, the process 1000 of the FIG. 10 also provides an extra stage screen in series, which is used to separate different types of solids, washing, and dewatering in one step. The new three sectional paddle screen with a high rate washing capability is designed/developed as part of this disclosure. Any other particle size reduction devices, such as Supraton, grind mill, pin mill, and roller mill all can be used on particle size reducing step 51. Roller mill used less horsepower and used shear force to decrease the thickness of particles, which can be used in the front-end liquefaction step 43. Grinding mills use more horsepower and use shear plus some cut action to decrease particle size, which can be used in both the front-end and backend particle size reducing step (such as Step 51). Pin mills use less horsepower and no cut action, which works by using an impacting force to reduce particle sizes, which can be used to replace a grinding mill and used in the front-end and backend for the particle size reducing step 51. Supraton uses extremely high shear force to break up particles to exceptionally fine particle, which is ideal for breaking up grit and germ particle in the front-end and backend steps. However, the Supraton will break the fiber, which creates dewatering problem in the downstream.

In the backend (after the fermenting step 23) of process 1000 of FIG. 10, the whole stillage is sent to the solid liquid separation step 82 after distilling 24. At the solid liquid separation step 82, the solids (mainly germ and grit particle) are sent to a particle size reducer at a solid size reducing step 51 to break up further to release starch and oil. At the solid size reducing step 51, the broken-up grit and germ particles are sent to a solid classification and washing step 102 to separate broken line germ/grit particle from fine fiber. The fresh cook water and back set stream are used as washing water in solid classification and washing step 102. The filtrate from the solid classification washing step 102 is used as washing water in the solid classification and washing step in step 101.

At the solid liquid separation step 82, the filtrate contains protein (yeast protein, fine germ protein, and corn protein), which is sent to a protein decanter 62 to separate/dewater corn protein for making chicken/pig feed 1002.

The overflow from the protein decanter 62 contains yeast protein and fine germ protein is sent to a thin stillage clarification step 65 to separate oil from protein. At the thin stillage clarification step 65, the underflow (rich in protein) is sent to another protein decanter 63 to produce high grade yeast/germ protein cake for household pet and fish 1004.

At the thin stillage clarification step 65, the overflow (rich in oil) is sent to an evaporator for an evaporating step 27 to produce 30 to 35% DS syrup. The syrup is sent to a backend oil recovery step 26 to recover corn oil as a feed stock for bio-diesel production.

FIG. 15 illustrates a high concentration enriched probiotic syrup production method in accordance with some embodiments. As shown in the process of FIG. 15, a de-oiled syrup is sent to a secondary fermentation step (e.g., Step 59 of FIG. 10). A mixture of lactic acid producing probiotic culture is added to the secondary fermenter (e.g., Step 59 of FIG. 10) to convert the resident sugar to lactic acid and to produce an enriched syrup, which has up to 20% of lactic acid in DB and $6*10^9$ CFU probiotic unit. This 30 to 35% DS enriched probiotic syrup also can further be evaporated to up to 85% DS in a low temperature vacuum evaporator 1502 to form a highly concentrated enriched syrup, which can be used as a food supplement in all animal feed. The waste heat recovery system (such as from a dryer 1502) can be added to the low temperature vacuum evaporator 1504 to use waste heat from a dryer 1502 as a heat source.

The FIG. 13 illustrates that both the enriched syrups (35% DS and up to 85% DS) have very high value nutrients, such as vitamin from yeast cell extract and up to 20% lactic acid plus up to $10^9$ probiotic unit can be used as a food preserver to keep wet feed fresh without spoil in wet feed system in an animal farm.

The FIG. 14 illustrates that the enriched syrups (35% DS up to 90% DS) have very high value nutrients, such as vitamin from yeast cell extract and up to 20% lactic acid plus up to $10^9$ probiotic unit, which can be used as a food supplement to all (wet/dry) feed system in an animal farm. Alternatively, it can be used as a bonding agent in the form of an enriched probiotic pellet or a feed tub for feeding cage free animals as antibiotic free animal feed.

The descriptions for the process steps, resultants, properties of the resultants (e.g., particle sizes), actions to be performed within the disclosure are all interchangeable and optional among all the figures.

A person of ordinary skill in the art appreciates that the processes and steps described herein in any of the figures and sections of descriptions are able to be used in any other figures and sections of descriptions. All the processes and steps described are performed in a corresponding device or structure. For example, a distilling step can be performed in a distiller, a fermenting step can be performed in a fermenter, and a separating step can be performed using any filtering and/or separating devices, such as centrifuges, decanter, screen separators.

In the present disclosure, the fermenting step 23 is used to divide the processes and/or systems into two ends including a front-end process and a backend process. The front end steps are steps performed before the fermenting step 23. The back end steps contain the steps that are performed after the fermenting step 23. The fermenting step 23 is able to be either considered as part of the front end or as part of the back end in different embodiments.

In the following, FIG. 11 illustrates a three sectional paddle screen in accordance with some embodiments.

An earlier effort to provide an improved apparatus and method for separating material, such as fiber, from a slurry or other liquid medium in a more efficient manner resulted in the multi-zoned screening apparatus of U.S. Pat. No. 9,718,006. The multi-zoned screening apparatus of U.S. Pat. No. 9,718,006 is a two-chamber paddle machine with a 400 mm screen zone diameter. Having only two chambers significantly limits the number of products that can be produced from the machine. The throughput of the machine is approximately 1000 gallons per minute. The wash water limit to maximum 90 GPM per unit, and the small amount of wash water allows for minor purification of large diameter particles as well as poor recovery of small diameter particles that should go through the screens. Furthermore, typical devices can separate more than one type of small particles. For example, in dry mill process whole stillage has grit, germ, Zein protein, yeast, fine fiber plus coarse fiber. If the solids are to be separated into a more pure form, it takes many existing units to make it to work. Accordingly, the Present Disclosure provides the three sectional paddle screens with 600 mm screen diameter, which can maximize washing water up to 600 gpm.

A cross sectional view of the three sectional paddle screen is illustrated in the FIG. 11.

With reference to FIG. 11, the apparatus 1100 comprises a single, self-contained device configured for pre-washing and separating, (e.g., filtering, a material, e.g., fiber, from a liquid medium, then further washing/de-watering the material).

With respect to a wet milling process, for example, the apparatus 1100 can perform both the initial filtering of the slurry and pre-washing of the fiber to clean the fiber and to remove starch/gluten that is associated with/attached to the fiber, as well as washing/dewatering of the fiber.

With respect to the dry milling process, the apparatus 1100 also can perform both an initial filtering and pre-washing of the fiber to clean the fiber and to remove the thin stillage that is associated with/attached to the fiber, as well as washing/dewatering of the fiber.

The apparatus 1100, as shown in the FIG. 11, includes a stationary, cylindrical-shaped screen 1102 having a plurality of openings 1104 formed therein to permit the liquid medium, including any wash water and any starch and/or gluten washed and/or fine suspended particles (including yeast from fermentation) off the fiber, for example, to pass through the screen 1102 while preventing the coarser fiber from passing therethrough. The screen 1102 is disposed in an interior of a housing 1106, which includes a first end wall 1108 and a second end wall 1110. The screen 1102 is situated about a central axis 1114 of the apparatus 1100 and extends substantially along the length (L) thereof.

Although a single or an unitary screen may be utilized here, the screens 1102 in the FIG. 11 as shown having individual first, second and third screen sections 1102A, 1102B and 1102C, which generally correspond respectively to the lengths of first, second and third zones 1116A, 1116B and 1116C of the housing 1106. The first screen section 1102A is situated proximate a tangential feed inlet 1118 located at one end of the apparatus 1100 adjacent the first zone 1116A to receive the incoming material and liquid medium and extends partly along the length (L) of the apparatus 1100 to about ⅓ point thereof. The second screen section 1102B is situated adjacent the first screen section 1102A and third section screen 1102C is situated adjacent to a second screen section 1102B and extends partly along the remainder of the length (L) of the apparatus 1100 to proximate a fiber discharge chute 1120, which is situated at an opposing end of the apparatus 1100 adjacent the third zone 1116C. It is noted that the lengths of the first, second and third screen sections 102A, 102B and 102C can vary. Also, while only three screen sections 102A, 102B and 102C are illustrated here, it is understood that more than three screen sections are able to be utilized. In addition, while the diameter of the screen 1102 is shown as being substantially constant along its length, the screen diameter can vary along at least one or more portions thereof.

The screen 1102 may include a wedge wire type with slot opening vertical or parallel or any angle to liquid flow direction, or a round hole, thin plate screen. In other embodiments, the screen may be a bar screen, a thin metal screen (e.g., mesh screen), or a filter cloth having a metal reinforced design. Those of ordinary skill in the art will recognize other types of screens that can be used in accordance with embodiments. The openings 1104 in the screen 1102 may vary depending on the specific application and on the type of material being filtered. For example, for fiber filtration, it is contemplated that the openings 1104 in the first, second and third screen sections 1102A, 1102B,1102C can be sized from about 10 microns to about 1 mm. In another example, the openings 1104 can be from about 30 microns to about 500 microns. The openings 1104 in the first screen section 1102A are able to be the same size as the openings in second screen section 1102B, larger than the openings in the second screen section 1102B, or smaller than the openings in the second screen section 1102B. Those of ordinary skill in the art will recognize how to determine the size of the openings 1104 to achieve the filtration of the desired material. Select right type of screen, screen opening size, and slot opening vertical or parallel to flow or round hole can select for those screens to meet any process needs.

As indicated above, the housing 1106 generally surrounds the screen 1102 and is adapted to collect the medium that passes through the openings 1104 in the screen 1102. The housing 1106 includes at least one side wall 1122 connecting the first, second and third end walls 1108, 1110, 1112 so as to define the interior. The housing 1106 further includes at least one interior panel 1124 that compartmentalizes the housing 1106 into the firs, second and third zones 1116A, 1116B 1116C, which include first, second third hoppers 1126A, 1126B and 1126C, respectively, with corresponding outlets for removing the filtered liquid medium and directing the filtered liquid medium to a desired location. The first zone 1116A generally defines an initial pre-washing and separation zone, and the second zone 1116B generally defines a solid particle separation zone, and third zone 1116C generally defines as washing/dewatering zone. The end of the third zone 1116C includes the discharge chute 1120 where the separated and washed/de-watered fiber material can be collected for further processing. Although three zones 1116A, 1116B and 1116C are illustrated here, those of ordinary skill in the art will appreciate that the number of separation zones 1116A and number of liquid/solid particle separation zone 1116B and the number of washing/dewatering zones 1116C can be application specific. The housing 1106 can have any suitable shape.

With further reference to the tangential feed inlet 1118, the feed inlet 1118 is at one end of the apparatus adjacent the first zone 1116A and in fluid communication with an interior of the first screen section 1102A. The feed inlet 1118 supplies the medium and material, e.g., fiber, to the apparatus 1100 and can introduce the medium and material in a swirling fashion (tangential entry along outside wall) to start filtering the fiber upon entry into the apparatus 1100. The feed inlet open area can be adjusted depending on feed rate and feed pressure to ensure that the feed tangential speed will be as close to paddle tangle speed to obtain a maximum optimized result.

The conveyor 1130 includes a rotatable shaft 1132 that extends along the length (L) of the apparatus 1100 and is situated about the central axis 1114. The shaft 1132 defines a first section 1134A that generally corresponds to the first zone 1116A and includes a plurality of spaced apart vanes 1136, which extend generally horizontally along substantially the length of the first zone 1116A. The spaced apart vanes 1136 also extend in a direction away from the shaft 1132 such that an outer surface of each is situated in spaced apart relation to the first screen section 1102A. The space between adjacent vanes 1136 defines an open cavity and provides a fluid flow passage for the liquid medium (e.g., slurry and/or wash water) during the filtration of the material (e.g., fiber), and can be sized to accommodate the design throughput of the apparatus. The number of vanes 1136 can range from about 2 to about 10. In another example, the number of vanes 1136 is from about 4 to about 8. In yet another example, the number of vanes 1136 is 6. The thickness of the vanes 1136 can range from about ¼ inch to about 2 inches. In another example, the thickness of the vanes 1136 can range from about ¼ inch to about ½ inch. The shape and orientation of the vanes 1136 may be changed as desired to adjust the flow of the liquid material and medium and the filtering characteristic of the apparatus 1100. In one example, the vanes 1136 can be oriented in a helical fashion about the length of the first section 1134A of the shaft 1132. In another example, the pitch or angle of the vanes 1136 relative to the shaft may be adjusted, as well as the spacing between the vanes 136, which can be constant or variable from one vane 136 to the next.

Helically wound about and secured to the outer surfaces of the vanes 1136 and occupying an area between the outer surface of the vanes 1136 and the first screen section 1102A, is at least one ribbon flight 1140. The ribbon flight 1140, which can be continuous or discontinuous, helically winds substantially about and along the length of the vanes 1136, which together define an auger 1142 for moving the material and liquid medium towards the screen 1102, and in a direction towards the discharge outlet 1120, so as to help wash and separate the material from the medium. The ribbon flight 1140 includes an outer edge configured to be located in close proximity to the inner surface of the first screen section 1102A. For example, a small gap (on the order of 0.3 mm-2.0 mm) can exist between the outer edge of the ribbon flight 1140 and the first screen section 1102A so as to accommodate, for example, relative movement therebetween, yet remain effective for keeping the filtration area at the first screen section 1102A clean. The thickness of the flight 1140 can be from about 1 mm to about 30 mm but can vary as desired. In another example, the thickness of the flight 1140 can be from about 3 mm to about 10 mm.

In one embodiment, the auger 1142 can have a multi-flight configuration (e.g., having multiple helical ribbon flights extending along at least a portion of the length thereof), which can enhance the filtering of the material from the liquid medium while preventing the screen 1102 from plugging. Those of ordinary skill in the art will recognize other configurations that facilitate the movement of the material through the apparatus 1100 to meet the requirements of a particular use, and the invention is not limited to the particular configuration shown in the FIG. 11. Another design variable that allows the auger 1142 to be configured for specific applications is the pitch of the ribbon flight 1140 along the length of the vanes 1136. In one embodiment, for example, the pitch may vary along the length.

The shaft 1132 of the conveyor 1130 further defines a second section 1134B adjacent the first section 1134A and that generally corresponds to the second zone 1116B. This second section 1134B includes a plurality of paddles 1146 that extend adjacently parallel to the second screen section 1102B and generally along the length thereof. Each paddle 1146 is connected to the shaft 1132 via a plurality of spaced apart support arms 1148. The length of each paddle 1146 may be adjusted, as desired. The paddles 1146 help move the material and medium towards the second screen section 1102B, as well as the discharge outlet 1120, so as to further separate and dry the material. The spacing between the paddles 1146 may be constant or variable from one paddle 1146 to the next. Each paddle 1146 can optionally include one or more rakes 1150. In one example, the number of rakes 1150 can range from about 4 to about 8. The number of rakes 1150 and paddles 1146 can be modified depending on the amount of solids in the feed, for example. The gap between the screen 1102 and paddle 1146 can range from about 0.25 to 0.65 inch. A smaller gap gives a drier cake with higher capacity and purer fiber. A larger gap gives a wetter cake with lower capacity and purer protein stream in slurry passing through screen openings.

A motor 1152 is operatively coupled to the conveyor 1130 for rotation of the shaft 1132 about the central axis 1114. A controller can be operatively coupled to the motor 1152 for controlling the rotational speed of the conveyor 1130, which may be constant or variable. Rotation of the shaft 1132 may be achieved by a suitable motor 1152 or other motive force-generating device, as understood in the art. For example, one end of the shaft 1132 can be operatively coupled to an electric motor, such as via a suitable belt or by direct drive, so as to cause the shaft 1132 to rotate about the central axis 1114. In one embodiment, the controller may be a computer, which can control the rotational speed of the shaft 1132. Such a controller is generally known to those of ordinary skill in the art. The rotational speed of the shaft 1132 can be selectively varied depending on the specific application. In one embodiment, the shaft 1132 may be rotated at a speed (e.g., revolutions per minute) that can range from about 100 to about 2000 RPM. In another example, the speed can range from about 400 to about 1000 RPM. In another example, the speed can range from about 500 to about 900 RPM. A higher speed provides higher capacity but consumes more power. Those of ordinary skill in the art will recognize that these values are exemplary and the speeds may be selected and optimized to meet the needs of a particular application.

The shaft 1132 of the conveyor 1130 further includes a liquid inlet 1156 that is centrally situated within and extends substantially along the length of the shaft 1132. The liquid inlet 1156 is adapted to receive wash water therethrough from a desired source. The shaft 1132 also has a plurality of liquid outlets 1158 associated with the liquid inlet 1156 and are spaced apart along substantially the length of the shaft 1132 within the first, second and third zones 1116A, 1116B and 111C for introducing wash water therein. One or more of the outlets 1158 may be controlled or eliminated altogether so as to prevent or reduce the amount of wash water entering into any one zone 1116A, 1116B and 1116C. Additionally, a counter current washing technique may be employed to save wash water usage.

The conveyor arrangement allows for pre-washing and filtering, as well as gentle (low turbulence) de-watering in the first zone 1116A, which can be desirable for avoiding emulsions and forcing oversized particles through the screen 1102. The paddles 1146 in the third zone 1116C do a predetermined job of producing a drier fiber for maximum liquid medium recovery from the fiber material. It is anticipated that the fiber material that exits the apparatus via the discharge chute 1120 can be between approximately 55% and approximately 80% water. This water concentration range represents a significant improvement over conventional systems (e.g., pressure and paddle screen devices), which typically provide fiber material at about 80% to about 92% water.

The apparatus 1100 further includes a baffle 1160 that is circumferentially disposed about and secured to the shaft 1132 at about the junction between the first and second zones 116A, 116B. Here, the baffle 1160 is specifically situated adjacent the end of the auger 1142 and the beginning of the paddles 1146. The baffle 1160 extends in a direction away from the shaft 1132, is generally perpendicular to the screen 1102, and includes an outer surface that is spaced apart therefrom. The gap between the baffle 1160 and the screen 1102 can be adjusted, as desired. In one example, the gap can range from about ⅛ inch to about 1 inch. The baffle 1160 helps to control compaction in the first zone 1116A and the amount of liquid medium that can be moved from the first to the second zone 1116A, 1116B, despite the size of the openings 1104 in the screen 1102.

Also, one or more removable access panels 1162, which are situated on the top side of the side wall 1122 of the housing 1106, can be provided for accessing the interior of the apparatus 1100. In addition, external valves 1164 can be situated on the underside of the side wall 1122 of the housing 1106 so that the filtered liquid medium from the first zone 1116A, second zone 1116B, and third zone 1116C, for example, can be obtained and analyzed/tested, such as for starch and protein concentrations.

The apparatus 1100 can have a length to diameter (L/D) ratio greater than two. In one embodiment, the apparatus 1100 may have a L/D ratio between approximately 2 and 10, and more preferably between 4 and 6. These values are exemplary and those of ordinary skill in the art will recognize other ratios suitable for a particular use.

In utilization, the methods and processes disclosed herein can be used to make animal feeds using various feedstock. For example although corns are used as an example, all other types of grains, including but not limited to, wheat, barley, sorghum, rye, rice, oats and the like, can be used. Products that are produced using the systems and processes disclosed herein include white fiber for paper industry, feed stock for secondary alcohol production, clean sugar solution for butanol, lysine, and plastics. Further, the process described herein can be combined with a use of a sugar solution from other bio-tech manufacturing process, such as sugar cane and five carbon sugar from other cellulose raw material.

In operation, particles of different sizes have been selectively separated after fermentation. Each part of different contents (e.g., proteins and nutrients) are separated into various animal feeds for different type of animals.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method of producing animal feed using a whole stillage in a dry milling process comprising:
   a) performing liquefying on a ground meal;
   b) performing fermenting on the liquefied ground meal after the liquefying;
   c) performing distilling generating the whole stillage after the fermenting;
   d) after distilling, separating the whole stillage into three portions having a solid portion, a slurry portion, and a liquid portion, wherein the solid portion contains mainly germ and grit particles, and further wherein the germ particles contain oil and the grit particles contain starch bonded fine fiber and protein, wherein the slurry portion contains fiber and zein protein, wherein the liquid portion contains proteins, oil, and soluble solid;
   e) selective milling to break up at least a portion of the germ and grit particles forming a selective milled content in the solid portion, wherein the selective milling releases the starch and the protein together from the grit and the oil from the germ;
   f) performing fiber washing to remove the germ and grit particles to form washed fiber, wherein the selective milled content after the fiber washing has <20% protein, <6% oil, and <3% starch; and
   g) producing a first animal feed, by using the selective milled content as a feedstock, having a content of higher than 50% of fiber and less than 20% of protein suitable for ruminant animals.

2. The method of claim 1, after the performing fiber washing, further comprising recycling the germs and grit particles that are milled to form fine germ and fine grit to a process step before the fermenting to further recover oil and produce alcohol for a second-round front-end process.

3. The method of claim 1, further comprising performing a first protein dewatering on the liquid portion of the step d) after distilling, separating whole stillage into a solid portion and a liquid portion.

4. The method of claim 3, further comprising producing a protein meal for chickens and pigs using a resultant of the first protein dewatering.

5. The method of claim 3, further comprising separating oil and protein in a fine particle stream from the step d) after distilling, separating whole stillage into a solid portion and a liquid portion.

6. The method of claim 5, further comprising perform a second protein dewatering of a protein rich stream from the separating oil and protein to produce a protein meal suitable for household pet and fish.

7. The method of claim 5, further comprising evaporating an oil rich portion of the separating oil and protein to make a syrup of 30% to 40% DS.

8. The method of claim 7, further comprising forming an enriched syrup by removing oil using a resultant of the evaporating and performing a secondary fermenting to convert residual sugar to lactic acid and 10^9 CFU/g probiotics.

9. The method of claim 7, further comprising concentrating the syrup using a low temperature vacuum evaporator at a temperature 140 F or lower to a concentrated syrup having 85% dry solids.

10. The method of claim 9, further comprising forming an enriched syrup animal feed having a moisture content higher than 10% moisture without going through a high temperature dryer having a temperature higher than 1000 F.

11. The method of claim 1, further comprising removing a pericarp and a tip cap before fermenting to improve fermenting efficiency.

12. The method of claim 1, wherein the selective milling comprises using multi sectional screens with different sizes of screen openings.

13. The method of claim 12, wherein the multi sectional screens comprises a wedge wire with slot openings parallel to a stream flow.

14. The method of claim 12, wherein the multi sectional screens comprises a wedge wire with slot openings perpendicular to a stream flow.

15. A method of producing animal feed using a whole stillage in a dry milling process comprising:
   a) performing liquefying on a ground meal;
   b) performing fermenting on the liquefied ground meal after the liquefying;
   c) performing distilling generating the whole stillage after the fermenting;
   d) after distilling, performing a selective size separation, based on a size of particles, separating the whole stillage into three streams, wherein the three streams contain a first stream of a large particle stream, a second stream of a coarse protein stream, and a third stream of a fine particle stream;
   e) forming a first animal feed having a content>50% of fiber and less than 20% of protein, by using a content material of the first stream as a feedstock, suitable for ruminant animals by:
      a. performing a selective milling to break up at least a portion of the germ and grit particles forming a selectively milled content in the solid portion, wherein the selective milling releases the starch and the protein together from the grit and the oil from the germ;
      b. performing fiber washing of the selectively milled content to remove the germ and grit particles to form a washed fiber; and
      c. performing a first fiber dewatering of the washed fiber;

f) forming a second animal feed having 40%-45% of protein and less than 4% of oil, by using a content material of the second stream as a feedstock, suitable for chicken and pigs by performing protein dewatering of the second stream;

g) forming a third animal feed having 40%-45% of protein and less than 4% of oil, by using a content material of the third stream as a feedstock, suitable for fish and pet by:
   a. performing oil and protein separating of a combined stream of the third stream and an overflow of the first fiber dewatering; and
   b. performing a second protein dewatering of a protein rich stream from the oil and protein separating; and h) forming a fourth animal feed having no greater than 20% of lactic acid and 109 CFU probiotics by:
   a. evaporating an oil rich stream from the oil and protein separating;
   b. performing syrup enriching after the evaporating to form a syrup having a dry solid content higher than 30%;
   c. performing a low temperature evaporating using a temperature no higher than 140 F to concentrate the syrup to have a dry solid content higher than 80%.

16. The method of claim 15, further comprising performing oil recovering after the evaporating.

17. The method of claim 15, further comprising using a liquid stream from the second protein dewatering as a backset liquid supply to a step before fermenting.

18. A method of producing animal feed using a whole stillage in a dry milling process comprising:
a) performing liquefying on a ground meal;
b) performing fermenting on the liquefied ground meal after the liquefying;
c) performing distilling generating the whole stillage after the fermenting;
d) after the distilling, performing a separating process of the whole stillage into at least a first and a second streams, wherein the separating process comprises a three sectional separating device having a first and a second screen filtrations in a first and a second sections and a decanter in the third section;
e) forming a first animal feed having a content>50% of fiber and less than 20% of protein for ruminant animals by using a content material of the first stream; and
f) forming a second animal feed having a content 40-45% of protein and less than 4% of oil for chickens and pigs by using a content material of the second stream.

19. The method of claim 18, further comprising generating a third animal feed for fish and pet by using a content material of a third stream as a feedstock generated from the separating process.

20. The method of claim 19, wherein the separating process separates an incoming stream from the distilling into a large particle stream as the first stream, a protein dewatering stream as the second stream, and a fine particle stream as the third stream.

21. The method of claim 18, wherein the separating process comprises using a coarse solid separating process separating a whole stillage from the distilling into a coarse portion and a protein portion.

22. The method of claim 18, wherein the separating process comprises separating a whole stillage from the distilling into a fiber and germ portion, fine protein portion, and a fiber and zein portion.

\* \* \* \* \*